United States Patent
Matsuzawa et al.

(10) Patent No.: US 11,263,885 B2
(45) Date of Patent: Mar. 1, 2022

(54) INFORMATION PROCESSING DEVICE, INFORMATION PROCESSING METHOD, INFORMATION PROCESSING PROGRAM, TERMINAL DEVICE, AND METHOD FOR CONTROLLING TERMINAL DEVICE

(71) Applicant: SONY CORPORATION, Tokyo (JP)

(72) Inventors: Sota Matsuzawa, Tokyo (JP); Takashi Nitta, Tokyo (JP); Futoshi Takeuchi, Tokyo (JP); Masatomo Kurata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/055,195

(22) PCT Filed: Mar. 1, 2019

(86) PCT No.: PCT/JP2019/008144
§ 371 (c)(1),
(2) Date: Nov. 13, 2020

(87) PCT Pub. No.: WO2019/220742
PCT Pub. Date: Nov. 21, 2019

(65) Prior Publication Data
US 2021/0118276 A1    Apr. 22, 2021

(30) Foreign Application Priority Data
May 16, 2018 (JP) .............................. JP2018-094743

(51) Int. Cl.
*G08B 21/00* (2006.01)
*G08B 21/02* (2006.01)
*G08B 21/18* (2006.01)
*H04B 1/3827* (2015.01)

(52) U.S. Cl.
CPC ........... *G08B 21/02* (2013.01); *G08B 21/182* (2013.01); *H04B 1/385* (2013.01)

(58) Field of Classification Search
CPC ....... G08B 21/02; G08B 21/182; H04B 1/385
USPC ...................................................... 340/686.1
See application file for complete search history.

(56) References Cited

U.S. PATENT DOCUMENTS

| 2005/0091332 | A1  | 4/2005  | Moro et al. |
| 2005/0136912 | A1* | 6/2005  | Curatolo ............ G08B 21/0227 455/423 |
| 2006/0288233 | A1* | 12/2006 | Kozlay .................. G06F 21/35 713/186 |
| 2008/0001764 | A1* | 1/2008  | Douglas .................. G07C 9/28 340/573.1 |

(Continued)

FOREIGN PATENT DOCUMENTS

| JP | 2005-064885 A | 3/2005 |
| JP | 2015-158708 A | 9/2015 |

(Continued)

OTHER PUBLICATIONS

International Search Report and Written Opinion of PCT Application No. PCT/JP2019/008144, dated May 7, 2019, 12 pages of ISRWO.

*Primary Examiner* — Zhen Y Wu
(74) *Attorney, Agent, or Firm* — Chip Law Group

(57) ABSTRACT

An information processing device that transmits a detection result to another device when abnormal detachment of a wearing device worn by a user is detected.

18 Claims, 23 Drawing Sheets

(56) References Cited

U.S. PATENT DOCUMENTS

| | | | |
|---|---|---|---|
| 2009/0180355 A1* | 7/2009 | Cartwright | G04G 21/00 368/12 |
| 2012/0050532 A1* | 3/2012 | Rhyins | G08B 21/0288 348/143 |
| 2013/0307688 A1* | 11/2013 | Hoffman | G08B 25/016 340/539.13 |
| 2014/0245784 A1* | 9/2014 | Proud | G06Q 40/04 63/1.11 |
| 2015/0205465 A1* | 7/2015 | Robison | G06F 3/0484 715/744 |
| 2016/0057268 A1* | 2/2016 | Jiang | H04B 1/385 455/556.1 |
| 2016/0241553 A1* | 8/2016 | Kim | H04L 67/125 |
| 2016/0321901 A1* | 11/2016 | Desoyza | A61B 5/0077 |
| 2016/0358446 A1* | 12/2016 | Ishii | G08B 25/016 |
| 2017/0024587 A1 | 1/2017 | Nonogaki et al. | |
| 2017/0035327 A1* | 2/2017 | Yuen | A61B 5/02438 |
| 2017/0154515 A1* | 6/2017 | DeForest | A61B 5/02438 |
| 2017/0265074 A1* | 9/2017 | Li | G06F 21/35 |
| 2018/0101721 A1* | 4/2018 | Nienhouse | B60K 28/063 |
| 2018/0122219 A1* | 5/2018 | Caterino | G07C 9/28 |
| 2018/0188697 A1* | 7/2018 | Urban | G08B 21/0288 |
| 2018/0213399 A1* | 7/2018 | Zeng | H04M 1/725 |
| 2019/0228633 A1* | 7/2019 | Tobiassen | G08B 21/0446 |

FOREIGN PATENT DOCUMENTS

| | | |
|---|---|---|
| JP | 2016-091265 A | 5/2016 |
| JP | 2017-028562 A | 2/2017 |
| WO | 2015/029573 A1 | 3/2015 |
| WO | 2017/145730 A1 | 8/2017 |

\* cited by examiner

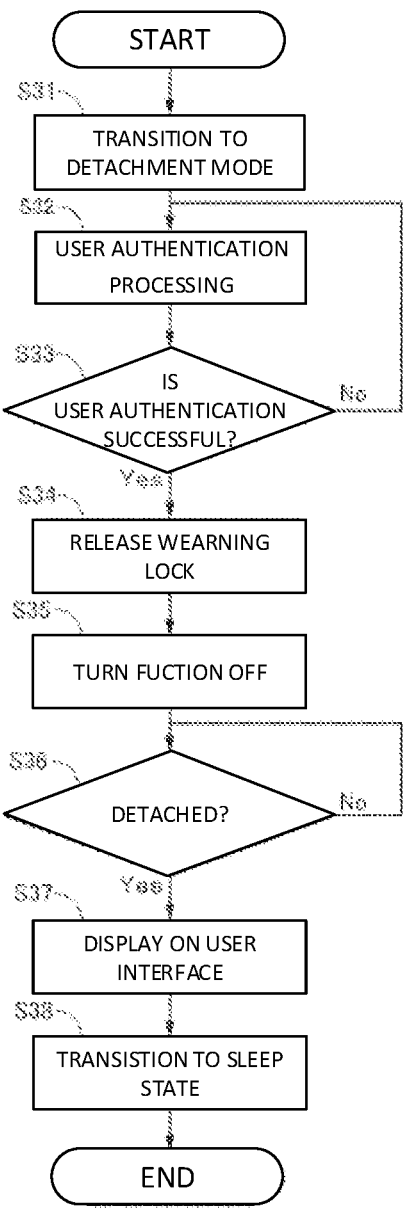

---112- detachment sensor
---140 - magnetic body

---110 - geomagnetic sensor
---120 - band portion
---150 - magnetic body

---100 - wristband

---100 - wristband
---120 - band portion
---160 - conductor

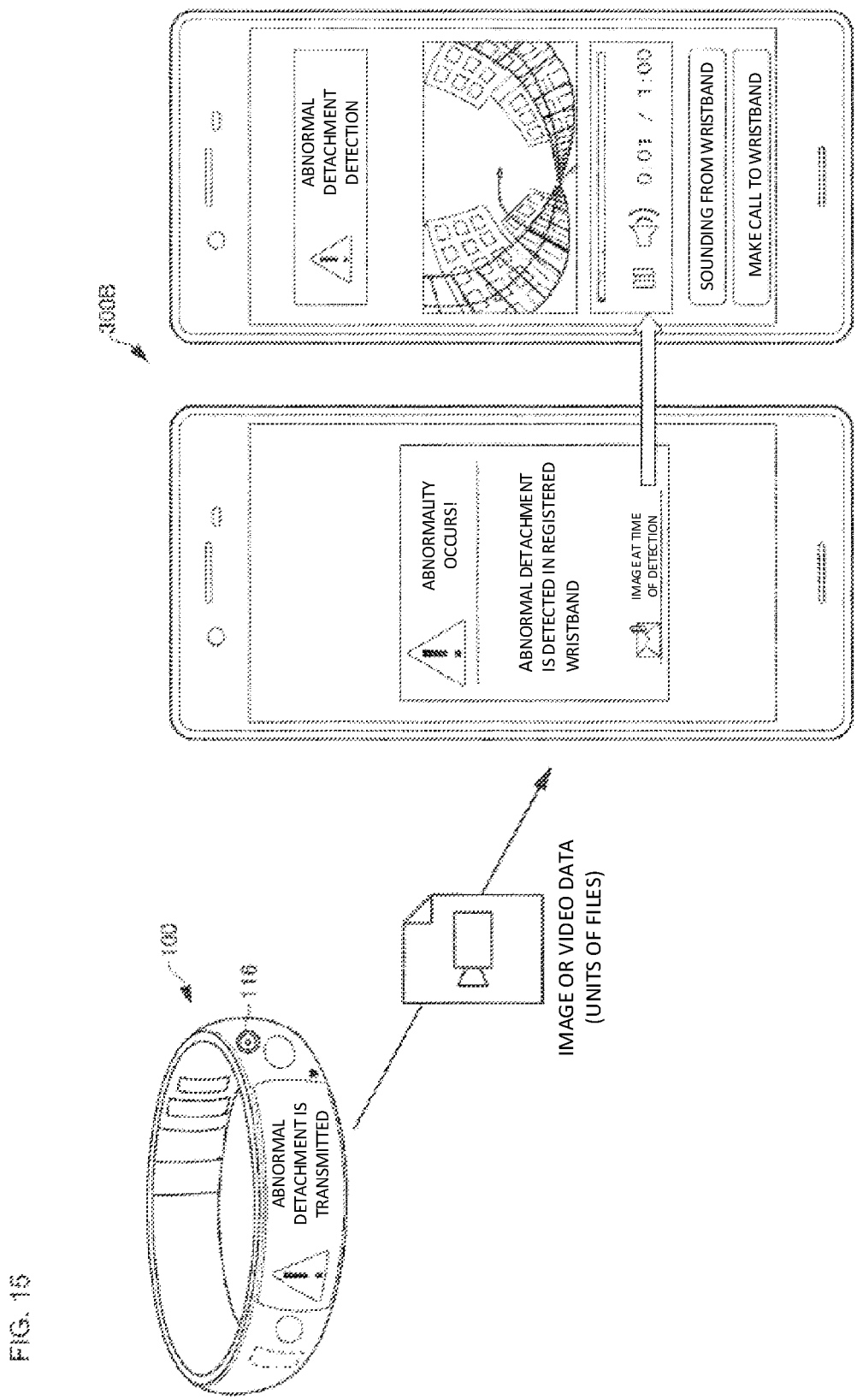

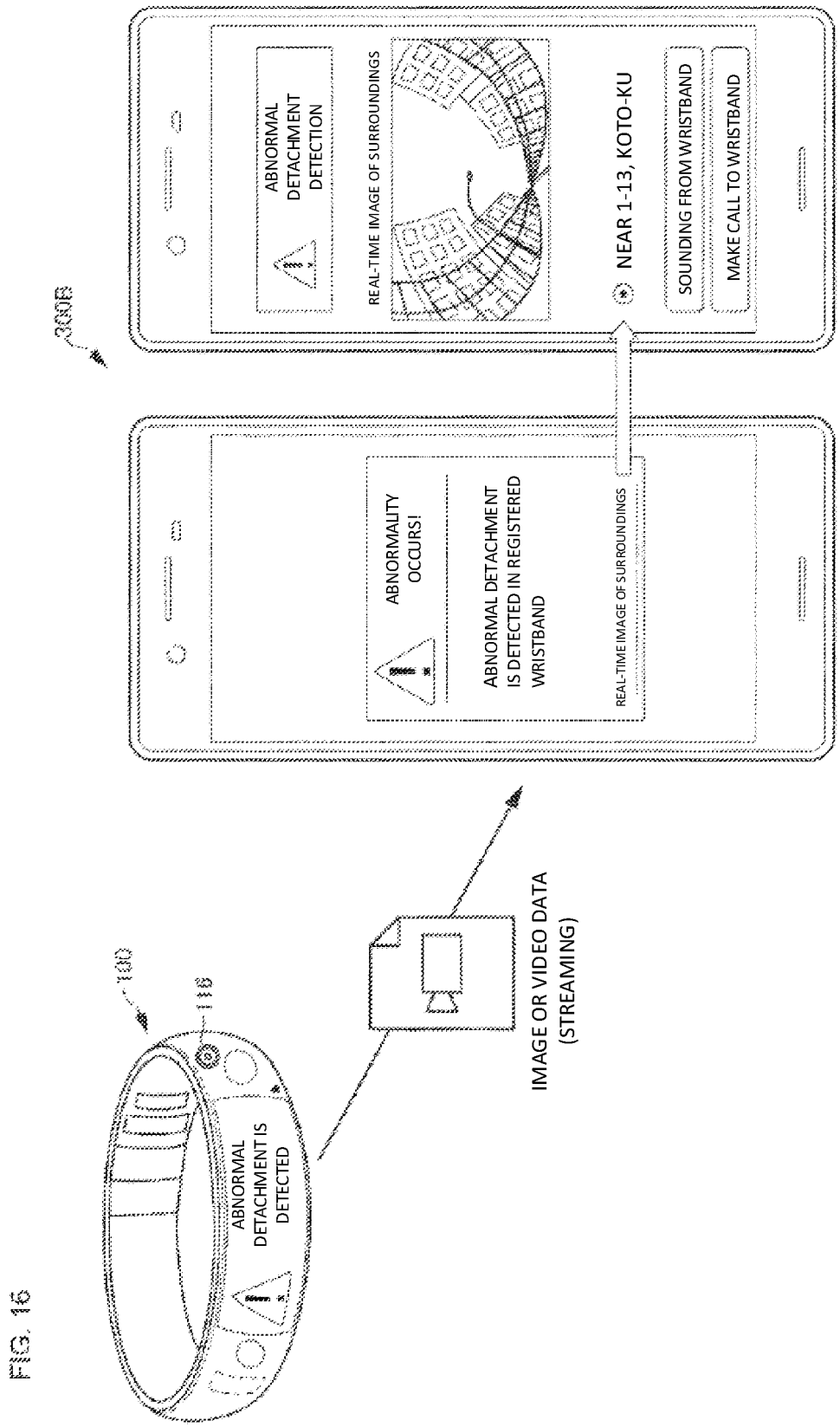

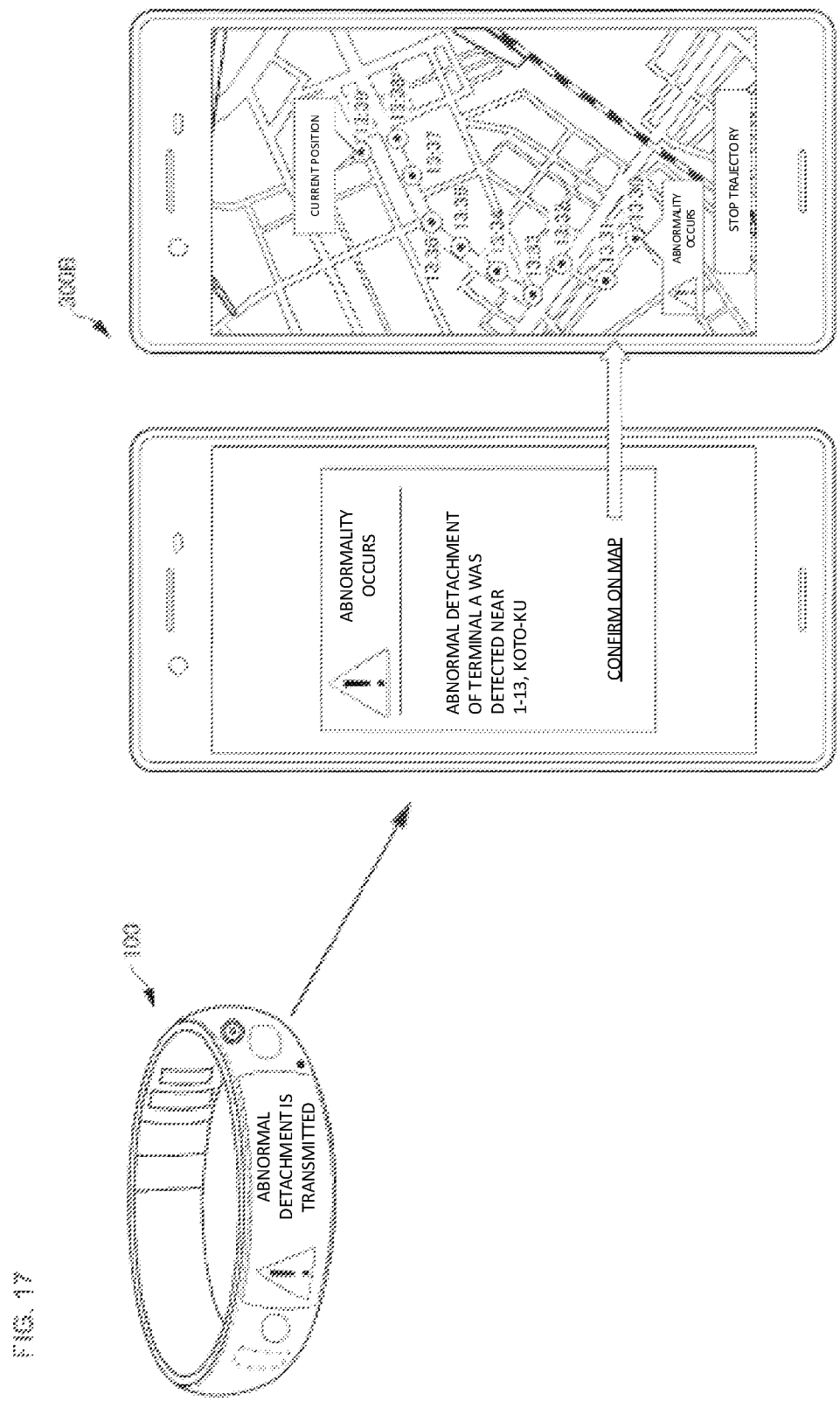

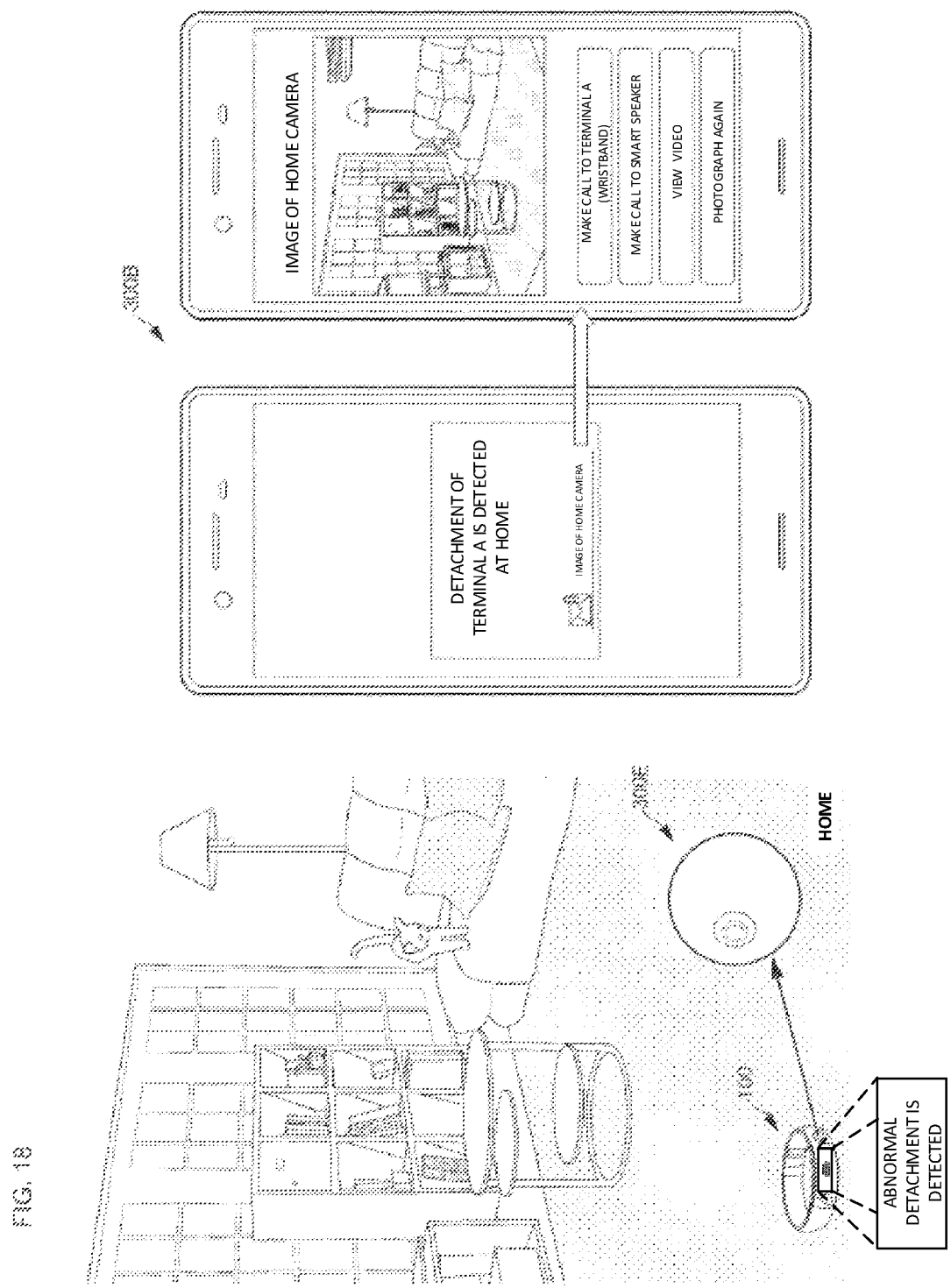

--- 6000 - watch-type wearable device

--- 7000 - core type device
--- 7001 - belt portion
--- 7002 - core

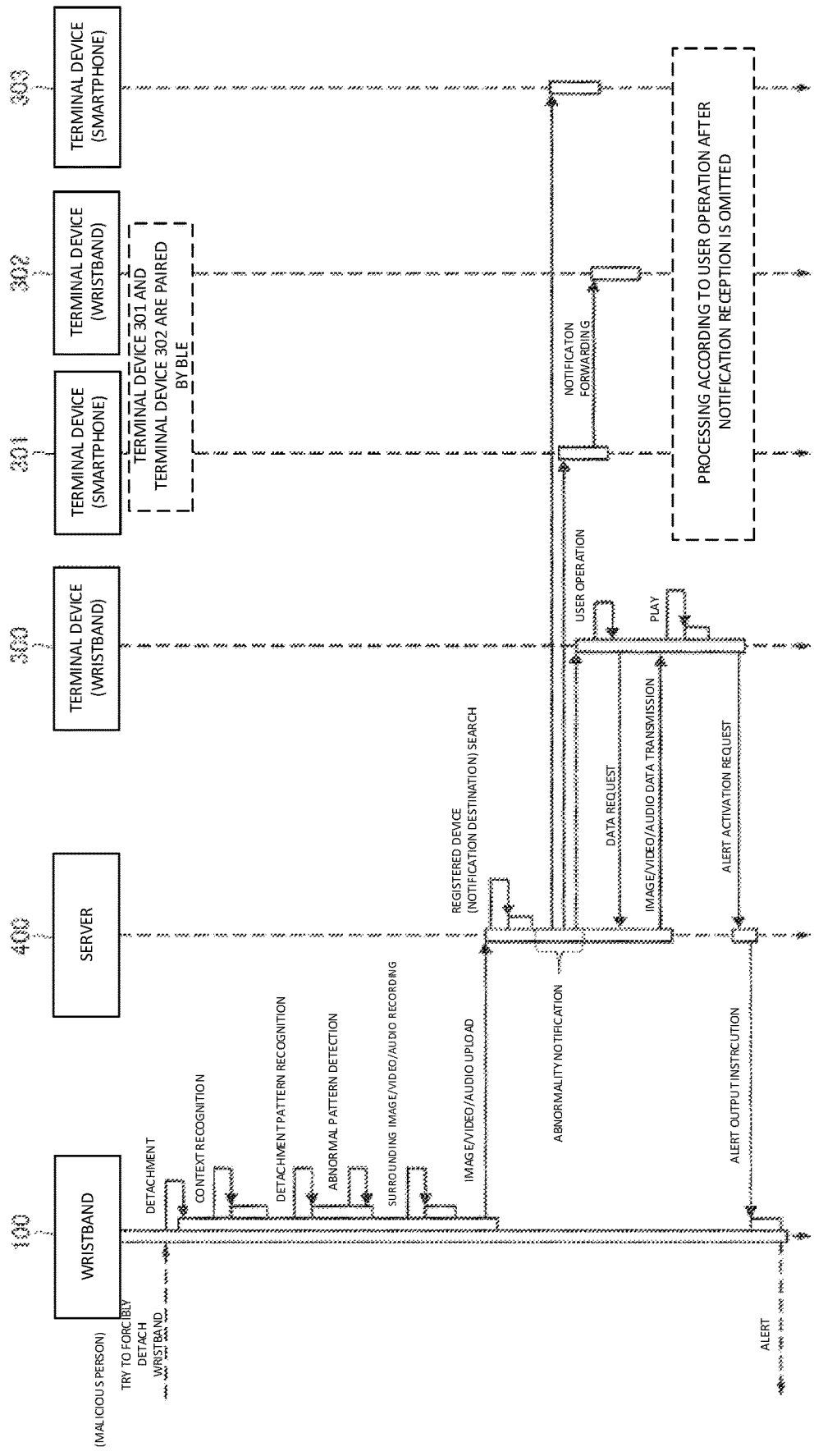

INFORMATION PROCESSING DEVICE, INFORMATION PROCESSING METHOD, INFORMATION PROCESSING PROGRAM, TERMINAL DEVICE, AND METHOD FOR CONTROLLING TERMINAL DEVICE

CROSS REFERENCE TO RELATED APPLICATIONS

This application is a U.S. National Phase of International Patent Application No. PCT/JP2019/008144 filed on Mar. 1, 2019, which claims priority benefit of Japanese Patent Application No. JP 2018-094743 filed in the Japan Patent Office on May 16, 2018. Each of the above-referenced applications is hereby incorporated herein by reference in its entirety.

TECHNICAL FIELD

The present technology relates to an information processing device, an information processing method, an information processing program, a terminal device, a method for controlling the terminal device, and a control program.

BACKGROUND ART

In recent years, opportunities for communication via a network have increased with the spread of mobile terminals and the advancement of network technologies. Therefore, technologies for realizing more diverse communications using networks have been developed.

One of the technologies is a so-called wristband type device serving as one type of wearable device proposed for the purpose of realizing more casual and intimate communication (PTL 1).

CITATION LIST

Patent Literature

[PTL 1]
WO 2015/029573

SUMMARY

Technical Problem

Such wearable devices (wearing devices) are increasingly used for the purpose of so-called "monitoring" for protecting children from crime, and are required to have a further enhanced security function.

The present technology has been made in view of the above circumstances, and an object of the present technology is to provide an information processing device, an information processing method, an information processing program, a terminal device, a method for controlling a terminal device, and a control program capable of confirming the safety of a user wearing a wearing device, and when the user is in a dangerous situation, notifying another device that the user is in the dangerous situation.

Solution to Problem

In order to solve the above-described problem, a first technology is an information processing device that detects abnormal detachment of a wearing device worn by a user and transmits a result of the detection to another device.

Further, a second technology is an information processing method for detecting abnormal detachment of a wearing device worn by a user and transmitting a result of the detection to another device.

Further, a third technology is an information processing program that causes a computer to execute an information processing method for detecting abnormal detachment of a wearing device worn by a user and transmitting a result of the detection to another device.

Further, a fourth technology is a terminal device that receives information on a wearing device worn by a user from an information processing device that detects abnormal detachment of the wearing device.

Further, a fifth technology is a method for controlling a terminal device that receives information on a wearing device worn by a user from an information processing device that detects abnormal detachment of the wearing device.

Further, a sixth technology is a control program that causes a computer to execute a control method for receiving information on a wearing device worn by a user from an information processing device that detects abnormal detachment of the wearing device.

Advantageous Effects of Invention

According to the present technology, it is possible to confirm the safety of a user wearing a wearing device and when the user is in a dangerous situation, notify another device that the user is in the dangerous situation. Effects described here are not necessarily limiting, and any effects described in the specification may be obtained.

BRIEF DESCRIPTION OF DRAWINGS

FIG. 7 is a flowchart illustrating processing in detachment of a wristband.

FIG. 15 is a diagram illustrating a fourth example of processing when abnormal detachment of a wearing device is detected.

FIG. 16 is a diagram illustrating the fourth example of processing when abnormal detachment of a wearing device is detected.

FIG. 17 is a diagram illustrating a fifth example of processing when abnormal detachment of a wearing device is detected.

FIG. 18 is a diagram illustrating a sixth example of processing when abnormal detachment of a wearing device is detected.

FIG. 23 is a sequence diagram illustrating processing when a server is used.

DESCRIPTION OF EMBODIMENTS

Figure 1:
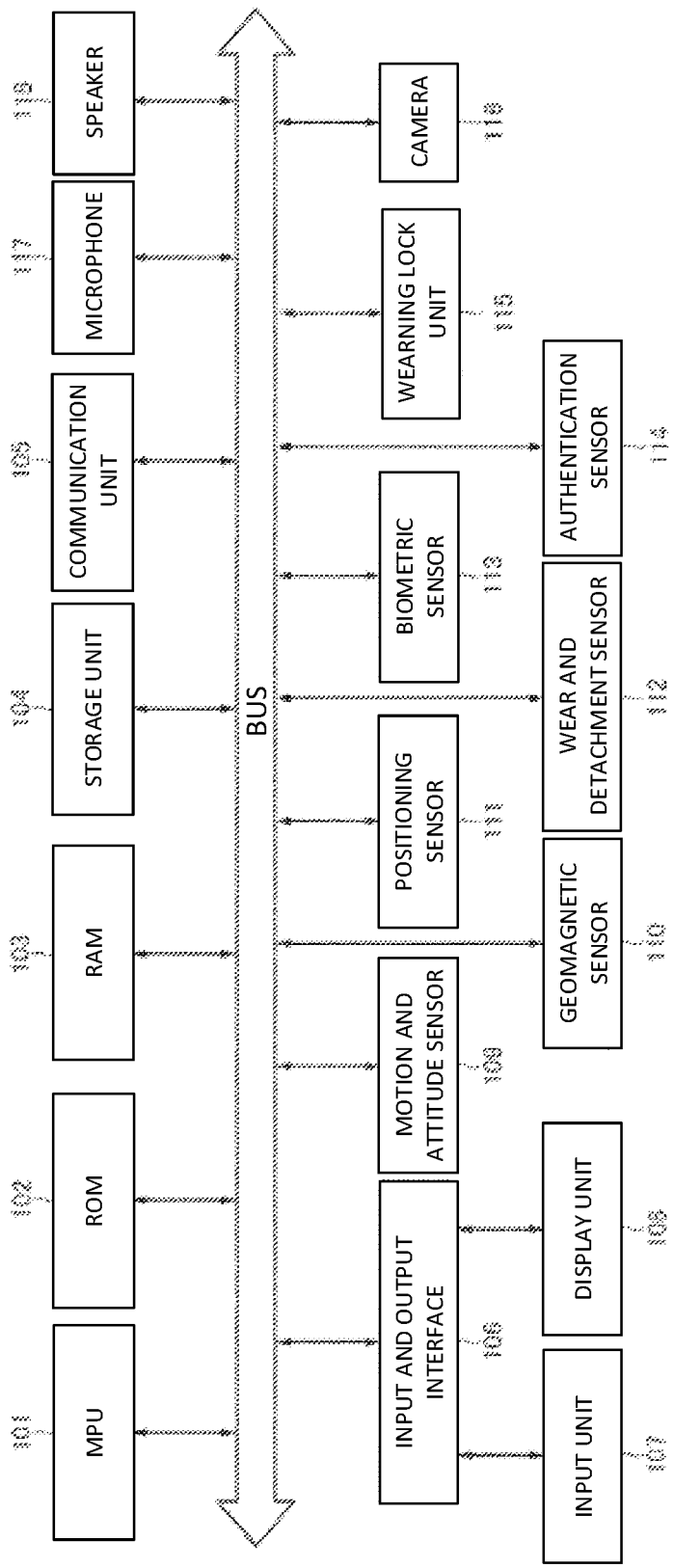
FIG. 1 is a block diagram illustrating a configuration of a wristband in which an information processing device according to the present technology is installed.

Hereinafter, embodiments of the present technology will be described with reference to the drawings. The description will be given in the following order.

<1. Embodiment>
[1-1. Configuration of wearing device]
[1-2. Configuration of information processing device]
[1-3. Processing in wearing]
[1-4. Processing in detachment]
[1-5. Authentication skip]
[1-6. Determination as to abnormal detachment]
[1-7. Processing when there is abnormal detachment]
<2. Modification example>

1. EMBODIMENT 1-1. Configuration of Wearing Device

First, as a wearing device in which an information processing device 200 according to the present technology is mounted, a hardware configuration of a wristband 100 (a wearable device) will be described. The wristband 100 includes a micro processing unit (MPU) 101, a read only memory (ROM) 102, a random access memory (RAM) 103, a storage unit 104, a communication unit 105, an input and output interface 106, an input unit 107, a display unit 108, a motion and attitude sensor 109, a geomagnetic sensor 110, a positioning sensor 111, a wear and detachment sensor 112, a biometric sensor 113, an authentication sensor 114, a wearing lock unit 115, a camera 116, a microphone 117, and a speaker 118.

Figure 2:
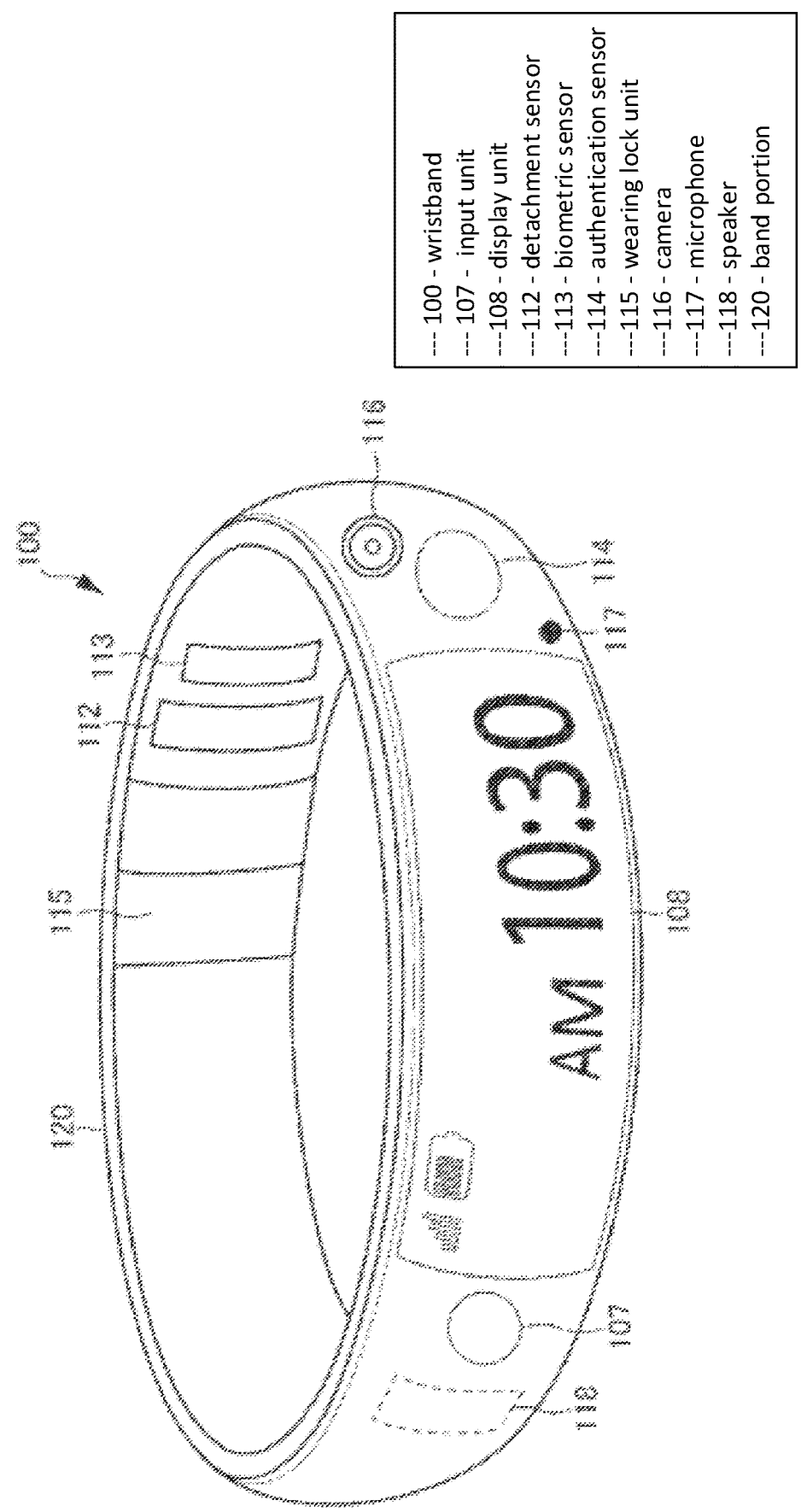
FIG. 2 is an appearance perspective view of the wristband.

As illustrated in an appearance perspective view of FIG. 2, the wristband 100 includes a ring-shaped band portion 120, and the input unit 107, the display unit 108, the authentication sensor 114, the wearing lock unit 115, the camera 116, the microphone 117, and the speaker 118 are provided to be visible on an outer surface of the band portion 120. The wear and detachment sensor 112, the biometric sensor 113, and the wearing lock unit 115 are provided to be visible on an inner surface of the band portion 120. A user wears the wristband 100 by fitting the band portion 120 on his arm. In the following description, a person who is registered as an owner in the wristband 100, wears the wristband 100, and uses the wristband 100 is referred to as a user.

Figure 3:
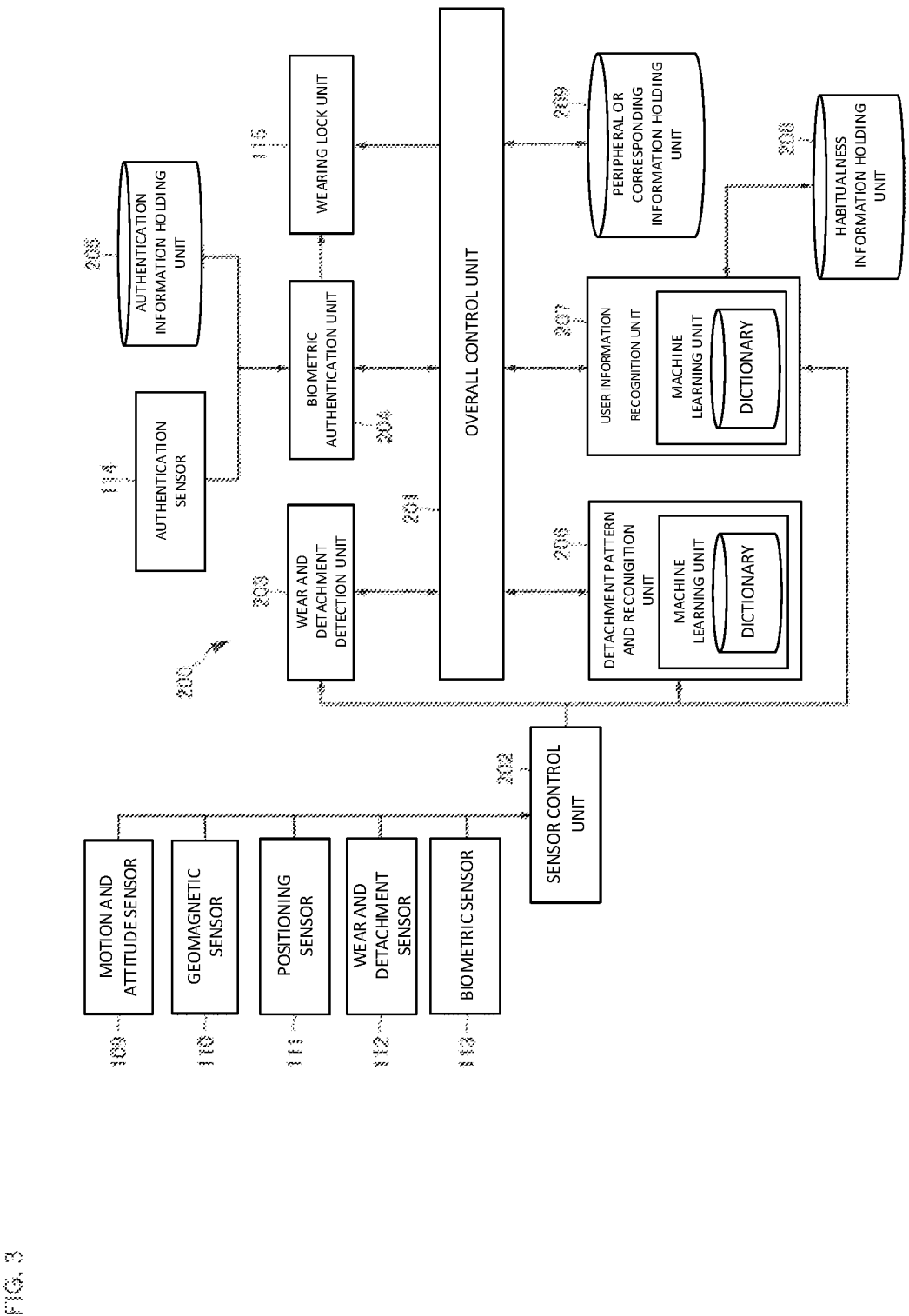
FIG. 3 is a block diagram illustrating a configuration of an information processing device.

The MPU 101 executes various processes according to a program stored in the ROM 102 to perform issuance of commands, to thereby perform control of the wristband 100 and control of each unit and perform processing of each unit illustrated in FIG. 3. The ROM 102 stores, for example, a program that is read and operated by the MPU 101. The RAM 103 is used as a work memory of the MPU 101.

The storage unit 104 is a storage medium such as a flash memory, for example. The storage unit 104 stores authentication information, biometric information, and the like necessary for use of the wristband 100.

The communication unit 105 is a communication module for transmitting and receiving data to and from the Internet, another device, a server, or the like. Communication may be performed by using any method as long as the method is a method for connection to the Internet, other devices, and the like, such as a wireless local area network (LAN), a wide area network (WAN), wireless fidelity (WiFi), 4th generation mobile communication system (4G), or broadband. Further, the connection with other devices may be performed by any method such as wireless LAN such as Wi-Fi, or wireless communication such as Bluetooth (registered trademark) or ZigBee.

The input and output interface 106 performs data transmission and reception with the input unit 107 and the display unit 108 through a bus.

The input unit 107 allows the user to input various instructions to the wristband 100. When the user performs an input to the input unit 107, a control signal according to the input is generated and supplied to the MPU 101 via the input and output interface 106. The MPU 101 performs various processes corresponding to the control signal. The input unit 107 may be a physical button, a touch panel, a touch screen integrated with the display unit 108, or the like.

The display unit 108 is a display device including, for example, a liquid crystal display (LCD), a plasma display panel (PDP), or an organic electro luminescence (EL) panel. Various types of information presented to the user by the wristband 100, a user interface for use of the wristband 100, and the like are displayed on the display unit 108.

The motion and attitude sensor 109 detects a motion and attitude of the wristband 100 using an acceleration sensor, an angular velocity sensor, a gyro sensor, an inertial sensor, and the like for two-axis or three-axis directions.

The geomagnetic sensor 110 is a sensor that detects a magnetic force of the earth, and detects a direction.

The positioning sensor 111 detects a current position of the wristband 100 using the Global Positioning System (GPS), a global navigation satellite system (GNSS), or the like.

The wear and detachment sensor 112 is a sensor that acquires information for detecting that the wristband 100 has been detached from the arm of the user. Examples of the information for detecting that the wristband 100 has been detached include a body temperature, a pulse wave, or the like of the user. When the biometric information of the user such as the body temperature and the pulse wave cannot be acquired, it can be detected that the arm of the user has been separated from the biometric sensor 113, that is, the wristband 100 has been detached from the arm of the user.

Further, the wear and detachment sensor 112 may be a button that remains in a state in which the button is pressed by the arm of the user when the wristband 100 is worn. It can be detected that the wristband 100 is worn while the pressed state of the button continues, and that the wristband 100 has been detached from the arm of the user when the pressed state is released.

Further, the wear and detachment sensor 112 may include a magnetic body such as a magnet that generates magnetism, which is provided at a location at which the magnetic body operates in wearing and detachment, and a magnetic sensor that detects the magnetism of the magnetic body. It can be detected that the wristband 100 is worn while the magnetic sensor detects the magnetism of the magnetic body, and that the wristband 100 has been detached when the magnetism is no longer detected. The present technology is not limited to these methods, and the wear and detachment sensor 112 may be any sensor as long as the sensor can acquire information for detecting the wearing and detachment of the wristband 100.

The biometric sensor 113 is a sensor that acquires biometric information such as a body temperature, blood pressure, and pulse wave of the user who wears the wristband 100. The biometric sensor 113 is preferably provided on the inner surface side of the wristband 100 so that the biometric sensor 113 can contact the user and acquire biometric information when the wristband 100 is worn. The authentication sensor 114 is a sensor for performing user authentication on the basis of biometric information, and acquires biometric information such as a fingerprint, voiceprint, or pulse wave that can be used for user authentication. A position on the authentication sensor 114 in which the authentication sensor 114 is provided in the wristband 100 varies depending on the biometric information to be acquired, but when a fingerprint is acquired, it is preferable for the authentication sensor 114 to be provided on the outer surface side of the wristband 100 so that the user can easily touch the authentication sensor 114 with a finger. Further, when a voiceprint is acquired, it is preferable for the authentication sensor 114 to be provided on the outer surface side of the wristband 100 so that a voice of the user can be easily collected. When the voiceprint is acquired, the microphone 117 may serve as the authentication sensor 114. Further, when a pulse wave is acquired, the biometric sensor 113 may serve as the authentication sensor 114.

The wearing lock unit 115 is a mechanical lock mechanism, an electronic lock mechanism, or the like provided inside the band portion 120, and locks the wristband 100 in a state in which the wristband 100 is fitted to the arm of the user. Any mechanism may be adopted as long as the mechanism can prevent the wristband 100 from being unintentionally detached in a worn state. The MPU 101 is notified that the band portion 120 has been locked by the wearing lock unit 115.

The camera 116 includes a lens, an image sensor, an image processing engine, and the like, and can capture and acquire images and videos. The camera 116 may be a hemispherical camera, a spherical camera, or the like.

The microphone 117 acquires a sound near the wristband 100. The speaker 118 outputs sound.

The wristband 100 is configured as described above.

1-2. Configuration of Information Processing Device

Next, a configuration of the information processing device 200 mounted on the wristband 100 will be described with reference to FIG. 3. The information processing device 200 includes an overall control unit 201, a sensor control unit 202, a wearing and detachment detection unit 203, a biometric authentication unit 204, an authentication information holding unit 205, a detachment pattern recognition unit 206, a user information recognition unit 207, a habitualness information holding unit 208, and a peripheral or corresponding information holding unit 209.

The overall control unit 201 performs overall control of the information processing device 200 and the wristband 100 and each of the units thereof, and various processes. Data from various sensors, authentication information, and the like are supplied to the overall control unit 201.

The motion and attitude sensor 109, the geomagnetic sensor 110, the positioning sensor 111, the wear and detachment sensor 112, and the biometric sensor 113 included in the wristband 100 are connected to the sensor control unit 202. Further, the authentication sensor 114 included in the wristband 100 is connected to the biometric authentication unit 204. The wearing lock unit 115 included in the wristband 100 is connected to the overall control unit 201 and the biometric authentication unit 204.

The sensor control unit 202 controls the motion and attitude sensor 109, the geomagnetic sensor 110, the positioning sensor 111, and the wear and detachment sensor 112, and supplies sensor information to the overall control unit 201.

The wear and detachment detection unit 203 detects wearing of the wristband 100 on the arm of the user and detachment of the wristband 100 from the arm of the user on the basis of the sensor information from the wear and detachment sensor 112.

The biometric authentication unit 204 performs processing of authenticating the user who uses the wristband 100 on the basis of the sensor information from the authentication sensor 114.

The authentication information holding unit 205 is a storage medium that holds biometric authentication information of a user used for biometric authentication. The biometric authentication information of the user is fingerprint information of the user when the biometric authentication is fingerprint authentication, voiceprint information of the user when the biometric authentication is voiceprint authentication, and pulse wave information of the user when the biometric authentication is pulse wave authentication. In addition, any information may be held as long as the information is biometric information that is used for the biometric authentication. When the user uses the wristband 100 for the first time, the user stores his or her authentication information in the authentication information holding unit 205 to register that the user is an owner of the wristband 100 and an associated user.

The detachment pattern recognition unit 206 recognizes a detachment pattern of the wristband 100 of the user on the basis of data indicating the normal detachment and the abnormal detachment of the wristband 100 using machine learning. The user information recognition unit 207 holds a pattern model (dictionary) for detachment of the wristband 100 of the user.

For the machine learning, various schemes such as k-nearest neighbor (k-NN), a support vector machine (SVM), and a neural network (including deep neural networks (DNN)) can be applied, and an algorithm is not limited. Further, a rule-based scheme can also be used as an alternative for easy implementation.

The user information recognition unit 207 recognizes context, that is, an action or state of the user, using the machine learning on the basis of sensor information from the motion and attitude sensor 109, the geomagnetic sensor 110, the positioning sensor 111, the wear and detachment sensor 112, and the biometric sensor 113. The user information recognition unit 207, for example, can recognize a place to which the user frequently goes, a place at which the user frequently stays, a place in a home or a school, and the like on the basis of position information from the positioning sensor 111. The user information recognition unit 207 holds a pattern model (dictionary) of an action or a state of the user.

The habitualness information holding unit 208 holds information based on habitualness of the user such as a position in which the user routinely stays, such as home, school, or a workplace, or a moving route.

The peripheral or corresponding information holding unit 209 stores information on the periphery of the wristband 100, information on other devices or equipment associated with the wristband 100 in advance, and the like, and supplies the information to the overall control unit 201 as necessary.

The information processing device 200 is configured as described above. The information processing device 200 is configured using a program, and this program may be installed in a processor such as the MPU 101 or a computer that performs signal processing in advance, or may be downloaded or distributed by a storage medium or the like so that the user can install the program in the wristband 100 by himself or herself. Further, the information processing device 200 may be realized not only by a program but also as a combination of a dedicated device, a circuit, and the like using hardware having functions of the information processing device 200.

The information processing device 200 may be configured on a server, receive sensor information and the like from the wristband 100 via a network to perform various processes on the server, and transmit control information to the wristband 100 to control the wristband 100. Further, some configurations of the information processing device 200 may be provided in the wristband 100, and other configurations may be provided in the server.

1-3. Processing in Wearing

Figure 4:
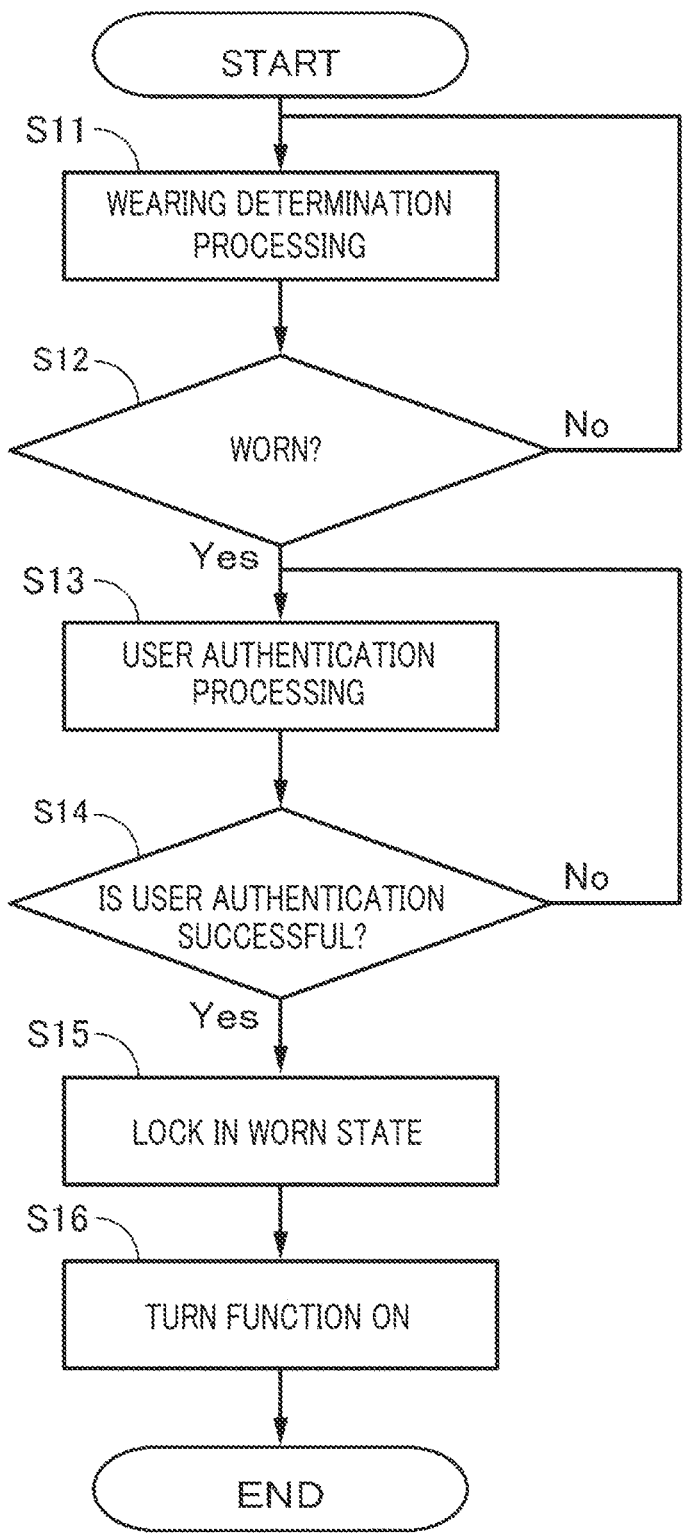
FIG. 4 is a flowchart illustrating processing in wearing of the wristband.

Next, processing when the wristband 100 is worn will be described with reference to a flowchart of FIG. 4. First, when a user wears the wristband 100, wearing determination processing is performed in step S11. This wearing determination processing is to determine whether or not a person wears the wristband 100, regardless of whether the person is a user who is an owner of the wristband 100. Details will be described below. When a determination is made that a person wears the wristband 100, the processing proceeds from step S12 to step S13 (Yes in step S12).

Next, user authentication processing is performed in step S13. The user authentication processing is performed by using the sensor information of the authentication sensor 114 by the biometric authentication unit 204. For example, the user authentication processing is performed by the user contacting the authentication sensor 114 with a finger when the authentication sensor 114 acquires the fingerprint as biometric information. The authentication at the time of wearing is first authentication processing in claims.

When the user authentication is successful, the processing proceeds from step S14 to step S15 (Yes in step S14). When the user authentication fails, the processing returns to step S13 and the user authentication processing is performed again. In this case, a threshold value is set for the number of failures of the user authentication processing, and when the number of failures exceeds the threshold value, biometric authentication processing ends, the authentication sensor 114 enters a non-operating state, and the user is notified of that fact.

Figure 5:
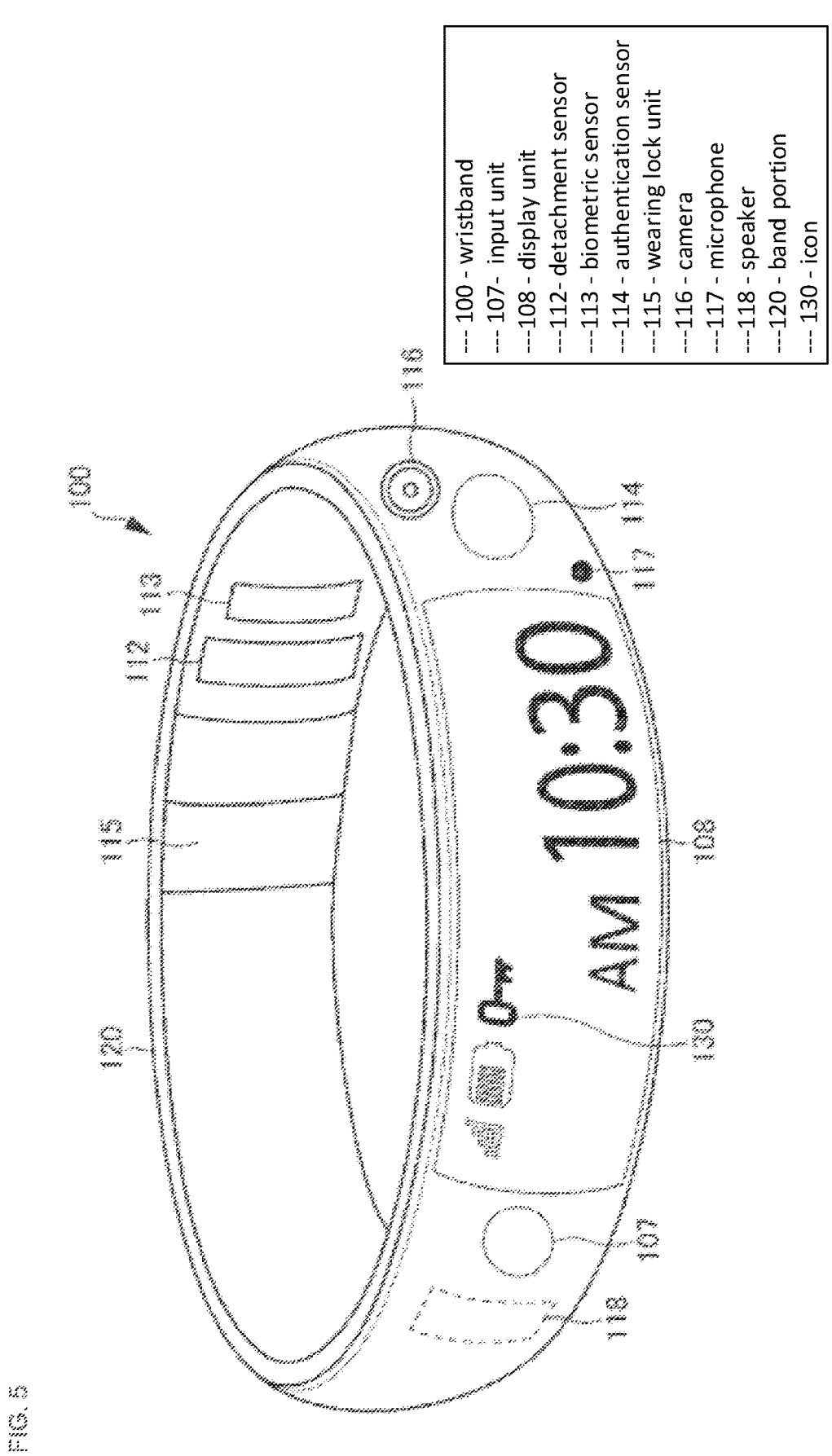
FIG. 5 is a diagram on a display example illustrating a wearing lock state.

Then, in step S15, the wristband 100 is locked in the worn state by the wearing lock unit 115. When the worn state is locked, the user cannot detach the wristband 100 without passing through wearing lock releasing processing. An icon 130, a message, and the like indicating that the wristband 100 is in a wearing lock state may be displayed on the display unit 108, as illustrated in FIG. 5.

In step S16, various functions (a communication function, a positioning function, a microphone function, a camera function, and the like) included in the wristband 100 are then turned on (an active state). This allows the user to use the various functions of the wristband 100.

The processing when the wristband 100 is worn is performed as described above.

Figure 6:
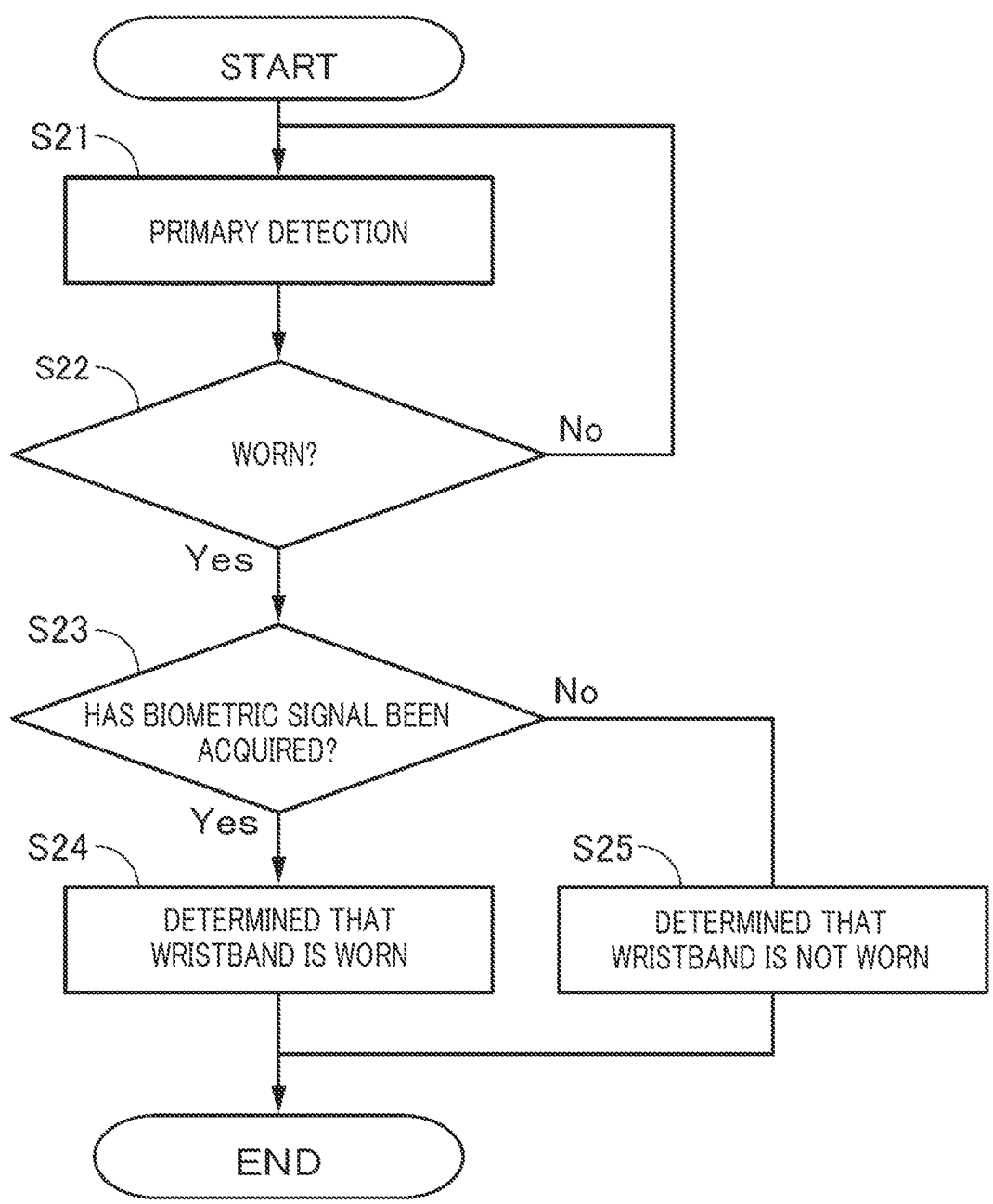
FIG. 6 is a flowchart illustrating wearing determination processing.

Details of the wearing determination processing of step S11 in the flowchart of FIG. 4 will be described with reference to the flowchart of FIG. 6 First, in step S21, primary detection is performed by the wearing and detachment detection unit 203. In this primary detection, it is detected that the wristband 100 is being worn by the user or a person.

The primary detection can be performed using various methods. In a first method, both of a mechanical mechanism and a sensor are used. In the first scheme, it is necessary for the wristband 100 to include a fastener portion serving as the mechanical mechanism and a pair of sensors capable of detecting contact through electrical conduction. When the fastener portion is fitted for wearing of the wristband 100 and the sensor detects the electrical conduction, it can be detected that the wristband 100 is being worn by the user.

In a second method, both of a mechanical mechanism and a sensor are used. In the second scheme, it is necessary for the wristband 100 to include a fastener portion serving as a mechanical mechanism, a magnetic body, and a magnetic sensor that detects magnetism. When the fastener portion is fitted for wearing of the wristband 100 and the fastener portion is set in a predetermined position, it can be detected that the wristband 100 is being worn by the user if the magnetic body approaches the magnetic sensor and the magnetic sensor detects magnetism.

A third method is performed by a sensor. In the third scheme, it is necessary for a proximity sensor that detects approach of a person to be provided inside the wristband 100. A method of detecting the approach of a person using the proximity sensor may be any method such as capacitance, infrared light, visible light, ultrasonic waves, or magnetism. When the user wears the wristband 100, the proximity sensor can detect the approach of the arm of the user and detect that the wristband 100 is being worn by the user.

When it is detected that the wristband 100 is being worn in the primary detection, the processing proceeds from step S22 to step S23 (Yes in step S22).

Next, in step S23, a determination is made as to whether or not a biometric signal has been acquired by the biometric sensor 113. When the biometric signal is acquired, the processing proceeds from step S23 to step S24, and a determination is made that the wristband 100 is in the worn state. On the other hand, when the biometric signal is not acquired, the processing proceeds from step S23 to step S25, and a determination is made that the wristband 100 is in a unworn state. It is preferable for the biometric signal used for this determination to be able to be acquired without the user being aware of the biometric information being read by the biometric sensor 113 or doing anything in a state in which the user wears the wristband 100. Examples of such biometric signals include a body temperature, a blood pressure, and a pulse wave.

In the determination of wearing based on the biometric signal acquisition in step S23, a determination is made that the wristband 100 is in the worn state without performing the user authentication processing with the biometric signal when the biometric signal is acquired. When it is detected through this primary detection that the wristband 100 is worn by, for example, an inanimate object such as a mannequin, a determination is made that the wristband 100 is in a unworn state. This can prevent the wristband 100 from being worn and used by an object other than a person.

In the wearing determination processing, two steps including the primary detection and the determination based on the presence or absence of the biometric signal are not essential configurations. However, performing the processing in the two steps as described above allows a configuration in which the biometric sensor 113 remains in an off state (in a non-operating state) until it is detected that the wristband 100 is being worn in the primary detection, and the biometric sensor 113 is turned on (an operating state) when the wristband 100 is being worn. Accordingly, when the biometric sensor 113 is turned on only when it is detected that the wristband 100 is being worn in the primary detection, it is not necessary for the biometric sensor 113 to be kept in the operating state at all times, and it is possible to achieve a reduction in power consumption of the wristband 100.

1-4. Processing in Detachment

Next, processing in detachment of the wristband 100 will be described with reference to the flowchart of FIG. 7. First, when the user inputs an instruction to transition to a detachment mode to the input unit 107, the information processing device 200 causes the wristband 100 to transition to the detachment mode in step S31.

The instruction to transition to the detachment mode from the user can be input in various methods. For example, a menu screen is displayed on the display unit 108 of the wristband 100, and an item for a transition to the detachment mode is selected through an input to a button (the input unit 107). Further, when the user utters "detach" in a state in which the user has performed an input to a voice input button (the input unit 107) for transition of the wristband 100 to a voice input mode (has pressed or contacted the voice input button, for example), the voice of the user is collected by the microphone 117 and the transition to the detachment mode occurs through voice recognition.

Next, user authentication processing is performed in step S32. The user authentication processing is performed by the biometric authentication unit 204 using the sensor information from the authentication sensor 114. For example, when the authentication sensor 114 is a fingerprint sensor, the user authentication processing is performed by the user contacting the authentication sensor 114 with a finger. This user authentication processing is intended to confirm whether a person who is trying to detach the wristband 100 is the user who is using the wristband 100. Authentication at the time of detachment is second authentication processing in the claims.

When the user authentication processing is successful, the processing proceeds from step S33 to step S34 (Yes in step S33). In step S34, the wearing lock state by the wearing lock unit 115 of the wristband 100 is released.

In step S35, various functions of the wristband 100 are then put in an off state (an inactive state). The off state is, for example, a power saving mode in which functions other than a wearing detection function and a positioning notification function are turned off. Further, all the functions including the wearing detection function and the positioning notification function may be turned off. This allows communication of the wristband 100 with the outside to be disconnected such that the wristband 100 cannot receive all operations and can be prevented from being misused by other persons.

In step S36, it is then detected that the wristband 100 has been detached from the arm of the user, by the wear and detachment detection unit 203, using the sensor information from the wear and detachment sensor 112. When it is detected that the wristband 100 has been detached from the arm of the user, the processing proceeds from step S36 to step S37 (Yes in step S36).

In step S37, a user interface indicating that the wristband 100 is detached normally and transitions to a sleep state is displayed on the display unit 108.

In step S38, the overall control unit 201 causes the wristband 100 to transition to the sleep state.

The processing of detaching the wristband 100 is performed as described above. The transition to the detachment mode and the user authentication processing in steps S31 to S33 are collectively performed by, for example, providing a fingerprint authentication function to a button (the input unit 107) for an input for instructing the wristband 100 to transition to the detachment mode. It is possible to realize faster detachment processing by authenticating the user using the fingerprint of the finger with which an input has been performed to instruct the transition to the detachment mode.

The user authentication can be performed by biometric authentication other than the fingerprint authentication. For example, the user authentication can also be performed using a voiceprint. It is possible to perform user authentication by storing feature data of the voiceprint extracted from utterance data of keywords registered in advance, in the authentication information holding unit 205, and comparing a feature of the voiceprint with a voice input from the microphone 117.

When the user authentication processing is voiceprint authentication, the voiceprint authentication may be performed using a voice for instructing a transition to the detachment mode in step S31. This allows the user authentication processing to be performed more smoothly.

Further, the user authentication can be performed using a face image. When the user wears the wristband 100, his or her face is photographed by the camera 116, and face image data and feature point information extracted from the face image data are stored in the authentication information holding unit 205. In the user authentication, it is possible to perform the user authentication by instructing the user to turn his or her face to the camera 116 and comparing an obtained face image with the face feature point information.

It is also possible to perform the user authentication using a front surface of an eyeball or an iris that is a film on a pupil. When the user wears the wristband 100, a pupil of the user is photographed by an infrared LED and an infrared camera, and pupil image data and iris feature point information extracted from the pupil image data are stored in the authentication information holding unit 205. In the user authentication, it is possible to perform the user authentication by instructing the user to turn his or her face to the camera 116 and comparing an obtained face image with the iris feature point information. In iris authentication, it is necessary for an infrared LED to be provided in the wristband 100.

It is also possible to perform the user authentication using a method other than the biometric authentication. For example, motion data that can be detected by the motion and attitude sensor 109 is stored in the authentication information holding unit 205 in advance, and the user is instructed to perform the motion at the time of user authentication. It is possible to perform user authentication by detecting the motion of the user using the motion and attitude sensor 109 and comparing data of the motion with the motion data stored in the authentication information holding unit 205.

Further, it is possible to perform the user authentication by providing a rotatable dial in the wristband 100 and rotating the dial to an angle, a position, or the like registered in advance.

Further, it is possible to perform the user authentication by requesting the user to input a character string registered in advance and comparing the input character string with the registered character string.

1-5. Authentication Skip

In the case of the processing in the detachment of the wristband 100 described above, the authentication processing is always required when the wristband 100 is detached. There is concern that this may cause the user to feel annoyed. Therefore, the overall control unit 201 may skip the authentication processing or lower a level of authentication, as will be described below, when a predetermined condition is satisfied.

As a first example, when the user wearing the wristband 100 is at a predetermined place (a home, a school, or the like), it is possible to skip the authentication at the time of detachment of the wristband 100. This is because the predetermined place such as the home or the school is a safe place, and therefore the safety can be secured even when the recognition is skipped in a case in which the user is there. Position information of the predetermined place may be registered in the information processing device 200 in advance, or may be determined from the position information acquired by the positioning sensor 111 through POI recognition based on habitualness using the machine learning in the user information recognition unit 207. This is because a home, a school, and the like that are places at which the user stays for a long time almost every day are considered safe. A determination can be performed as to whether the user is at the predetermined place such as the home or the school on the basis of the position information acquired by the positioning sensor 111.

Authentication at the time of detachment may be skipped at a point in time at which the user enters the predetermined place, or the authentication at the time of detachment may be skipped when the user stays for a predetermined time at a predetermined place. This is intended to prevent, for example, a malicious third party (hereinafter referred to as a malicious person) from taking the user to a predetermined place and detaching the wristband 100. Whether the user stays at the predetermined place for a predetermined time can be confirmed by performing counting from a point in time at which it is confirmed that the user has entered the predetermined place on the basis of the position information.

As a second example, when the user wearing the wristband 100 stays at a predetermined place such as home, a pulse wave is acquired as biometric information by the biometric sensor 113, and the pulse wave is in a range of predetermined normal values, the authentication can be skipped. This is because the predetermined place is the same as that in the first example, and when the user stays in such a safe predetermined place and the pulse wave has a normal value, the user is considered not to feel anxiety or fear. The biological information is not limited to the pulse wave, and may be any information as long as it can be confirmed from the information whether the user feels anxiety or fear.

As a third example, it is possible to skip the authentication at the time of detachment of the wristband 100 when the user is in a predetermined range from other equipment (for example, a personal computer, a smart speaker, or a communication robot at home) owned by the user wearing the wristband 100, which has been registered in advance.

This is because it can be said that the user is in a safe position when the user is near the equipment that the user owns. A determination can be performed as to whether or not the user is at a position in a predetermined range from other equipment owned by the user, through detection using a wireless communication technology between the wristband 100 and the other equipment, proximity detection using correlation with environmental sounds, or the like. Further, it is preferable for the other equipment to be at a place at which the user habitually stays for a long time, such as a home or school of the user.

As a fourth example, when the user is near a predetermined person (a family member or the like), it is possible to skip the authentication at the time of detachment of the wristband 100. A determination can be performed as to whether or not the user is near the predetermined person, such as a family member, through detection using a wireless communication technology between the wristband 100 and equipment owned by a family member registered in advance (a wristband worn by the family member, a personal computer owned by the family member, or the like), proximity detection using correlation with environmental sounds, or the like. Further, a voice of the predetermined person such as a family member may be collected by the microphone 117 without using equipment owned by the family member, and a determination may be performed as to whether or not the user is near the predetermined person through voiceprint collation. This example is not limited to family members and may be any person such as a school teacher as long as the person can confirm the safety of the user. It is necessary for information for identifying the predetermined person (identification information of equipment owned by the predetermined person, or the like) to be stored and registered in the peripheral or corresponding information holding unit 209 in advance.

As a fifth example, it is possible to skip the authentication at the time of detachment of the wristband 100 in a case in which the user moves from a predetermined position to another predetermined position. This is because, for example, when the user moves from a school to a home or moves from a company to a home, and passes through a safe route that is habitually used, the safety of the user can be confirmed. This can be performed by recognizing a habitually used route through the machine learning of the user information recognition unit 207 using the position information.

As a sixth example, it is possible to skip the authentication at the time of detachment of the wristband 100 when the user arrives in a predetermined position such as a home in a state in which it is confirmed that the wristband 100 is worn by an authorized user from a gait of the user (a state of walking obtained by analyzing a body operation, a body structure, muscle activity, and the like). This is because it can be said that it is possible to confirm that the authorized user wears the wristband 100 from the gait and that the user is safe in a case in which the user returns to home. Return of the user to the home can be confirmed from the position information. It is necessary for gait information of the user to be generated through machine learning of the user information recognition unit 207 and stored and registered in a machine learning unit in the user information recognition unit 207.

As a seventh example, it is possible to skip the authentication at the time of detachment of the wristband 100 in a case in which the user performs a preset gesture operation in a state in which the user stays in a predetermined position such as a home. This is an example in which the biometric authentication is replaced with the gesture operation. It can be confirmed from the detection result of the motion sensor whether or not the gesture operation of the user is a predetermined gesture operation. It is necessary for the gesture operation to be stored and registered in the machine learning unit in the user information recognition unit 207 in advance.

1-6. Determination as to Abnormal Detachment

In the processing of detaching the wristband 100 described above, when the wristband 100 has been detached or is about to be detached without performing normal detachment processing, it can be said that the abnormal detachment has occurred or is about to occur. A determination as to whether or not the detachment of the wristband 100 is the abnormal detachment can be performed by the following method using the sensor information.

Figure 8A:
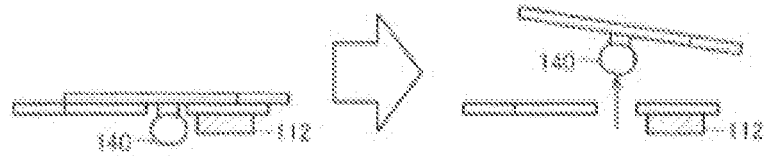
FIGS. 8A, 8B, 8C, and 8D are diagrams illustrating an abnormal detachment detection method.

The first method includes determining that the detachment is abnormal detachment when it is detected that the wristband 100 has been detached by the wear and detachment sensor 112 in a state in which user authentication is not successful using the sensor information from the authentication sensor 114. In the example of FIG. 8A, a magnetic body 140 that generates magnetism is provided at a location at which the magnetic body 140 operates when the wristband 100 is detached, and the magnetism from the magnetic body 140 is detected using a magnetic sensor serving as the wear and detachment sensor 112. A determination is made that the detachment is abnormal when the magnetism from the magnetic body 140 cannot be detected in a state in which the biometric authentication is not successful.

Figure 8B:
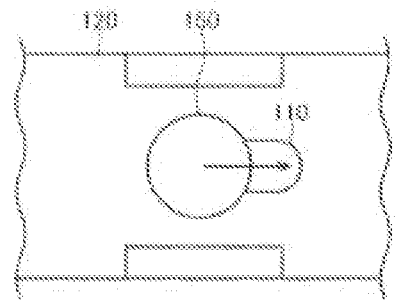

In the second method, in a case in which the wristband 100 includes a buckle portion 150, a determination is made that the detachment is abnormal detachment when it is detected by a capacitance sensor or the like that a force acts in a direction in which the force does not act in normal detachment in the buckle portion 150, as illustrated in FIG. 8B. A magnetic sensor or the like may be used in this method.

Figure 8C:
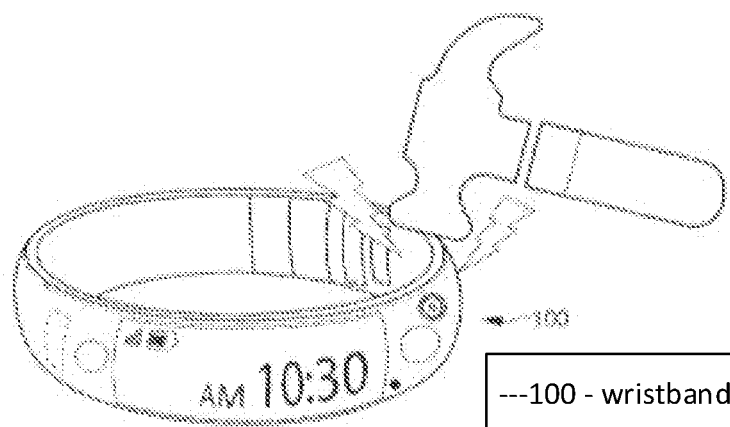

In a third method, a determination is made that the detachment is abnormal detachment when a motion of the wristband 100 is detected by the motion and attitude sensor 109 and a motion not included in a motion pattern registered in advance is detected, or when a moving operation (abnormal vibration) is detected from a detection result of the motion and attitude sensor 109 through machine learning, as illustrated in FIG. 8C. For example, when a malicious third party hits the wristband 100 with a blunt instrument in order to break and detach the wristband 100, it is possible to detect vibration of the hit and determine that the detachment is abnormal detachment.

Figure 8D:
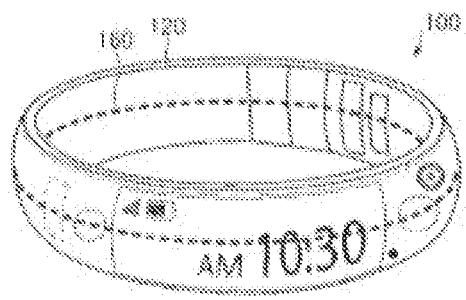

In a fourth method, when it is detected that the band portion 120 of the wristband 100 has been cut, a determination is made that the detachment is abnormal detachment, as illustrated in FIG. 8D. For example, a conductor 160 for conduction is provided inside the band portion 120 to go around the band portion 120, and when the conduction is interrupted, a determination can be performed that the conductor 160 is cut, that is, the band portion 120 is cut.

1-7. Processing when there is Abnormal Detachment

Next, processing when a determination is made that the detachment of the wristband 100 is the abnormal detachment as described above will be described. When the wristband 100 has been detached or is about to be detached due to the abnormal detachment, the user is in danger or is highly likely to be in danger. Therefore, when the abnormal detachment is detected, the information processing device 200 transmits a result of the detection to the terminal device that is another device. Hereinafter, processing that is performed together with the transmission of the detection result will be described.

In the following description, there is a terminal device 300 registered in association with the wristband 100, and it is necessary for the user to store information (device identification information or the like) for identifying the terminal device 300 in the peripheral or corresponding information holding unit 209 in advance and perform processing of associating the information with the wristband 100.

Figure 9:
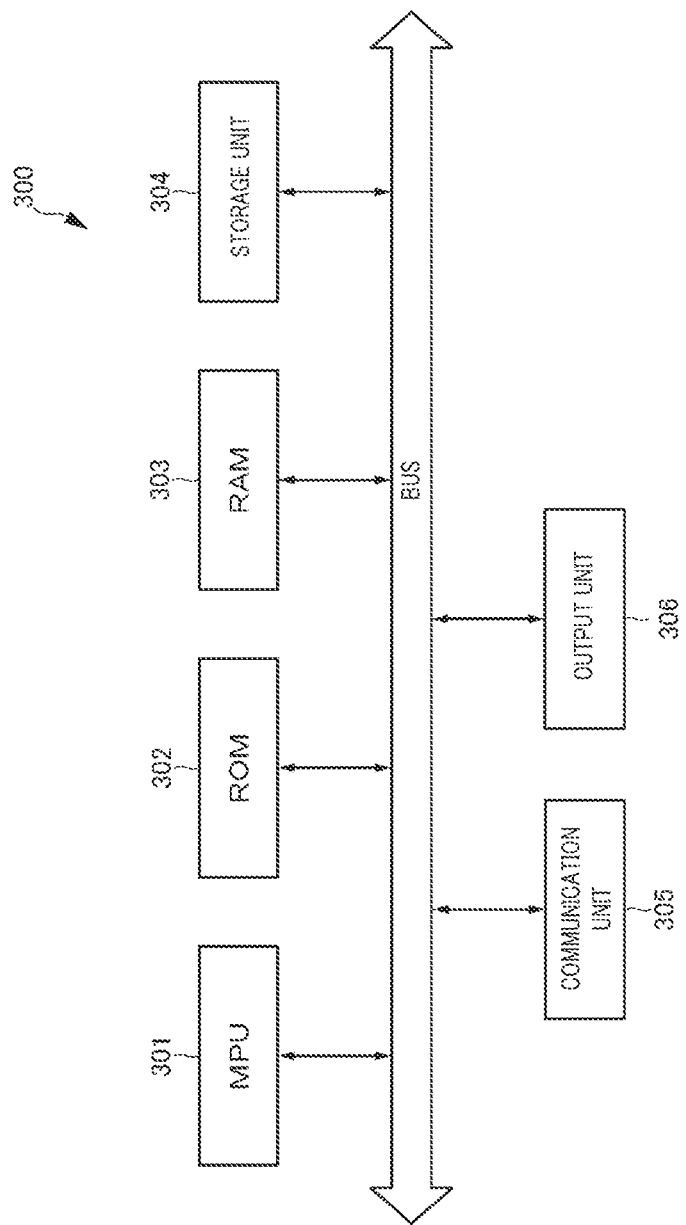
FIG. 9 is a block diagram illustrating a configuration of a terminal device.

The terminal device 300 includes at least an MPU 301, a ROM 302, a RAM 303, a storage unit 304, a communication unit 305, and an output unit 306, as illustrated in a block diagram of FIG. 9. The MPU 301, the RAM 302, the ROM 303, the storage unit 304, and the communication unit 305 are the same as those described in the wristband 100 serving as a wearing device. The output unit 306 may be any device that outputs information, such as a speaker that outputs sound, a display device such as a display that displays images and videos, and a projector that projects images and videos, and is specifically determined depending on what type of device the terminal device 300 is. Examples of the terminal device 300 include a wearable device such as a wristband, a smartphone, a tablet terminal, a personal computer, a smart speaker, a projector, and a communication robot.

A control method to be executed by the terminal device 300 is configured using a program, and this program may be installed in a processor such as the MPU 301 in advance, or may be downloaded or distributed by a storage medium or the like so that the user can install the program in the terminal device 300 by himself or herself. Further, the control method to be executed by the terminal device 300 may be realized not only by a program but also in combination of a dedicated device, a circuit, and the like using hardware having functions of the terminal device 300.

Figure 10:
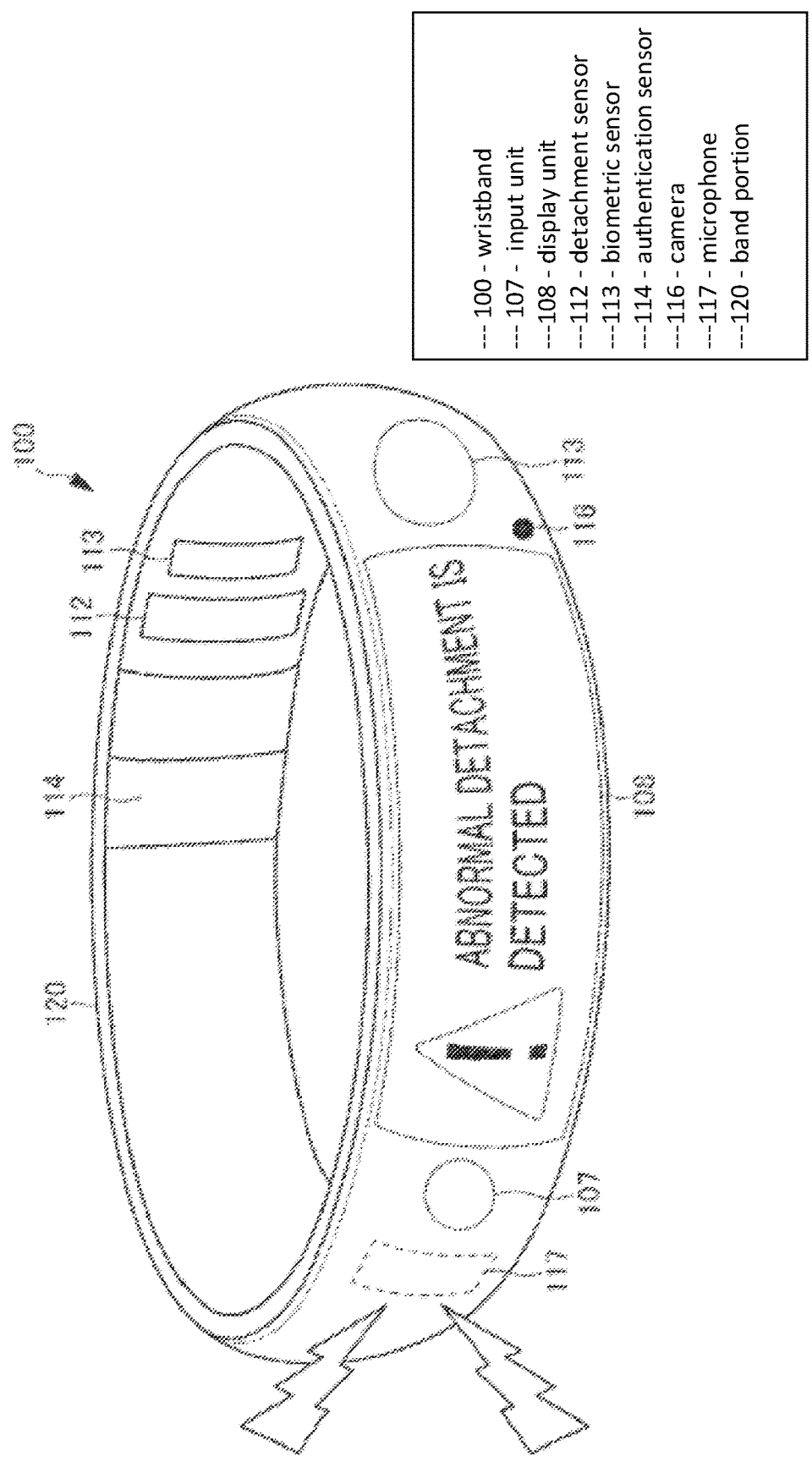
FIG. 10 is a diagram illustrating a first example of processing when abnormal detachment of a wearing device is detected.

In the first method, when the abnormal detachment is detected, a result of the detection is transmitted to the terminal device, and the surroundings are informed of the result by an alert such as sounding a buzzer sound from the speaker 118, as illustrated in FIG. 10. This alert is alert execution processing in claims. This allows the surroundings to be informed that the wristband 100 is abnormally detached and the user is in a dangerous state, and the malicious person to be intimidated. The alert may include flickering a flash, as well as sounding a buzzer. User authentication based on the biometric authentication may be required to stop the alert. This can prevent a malicious person from stopping the alert.

Figure 11:
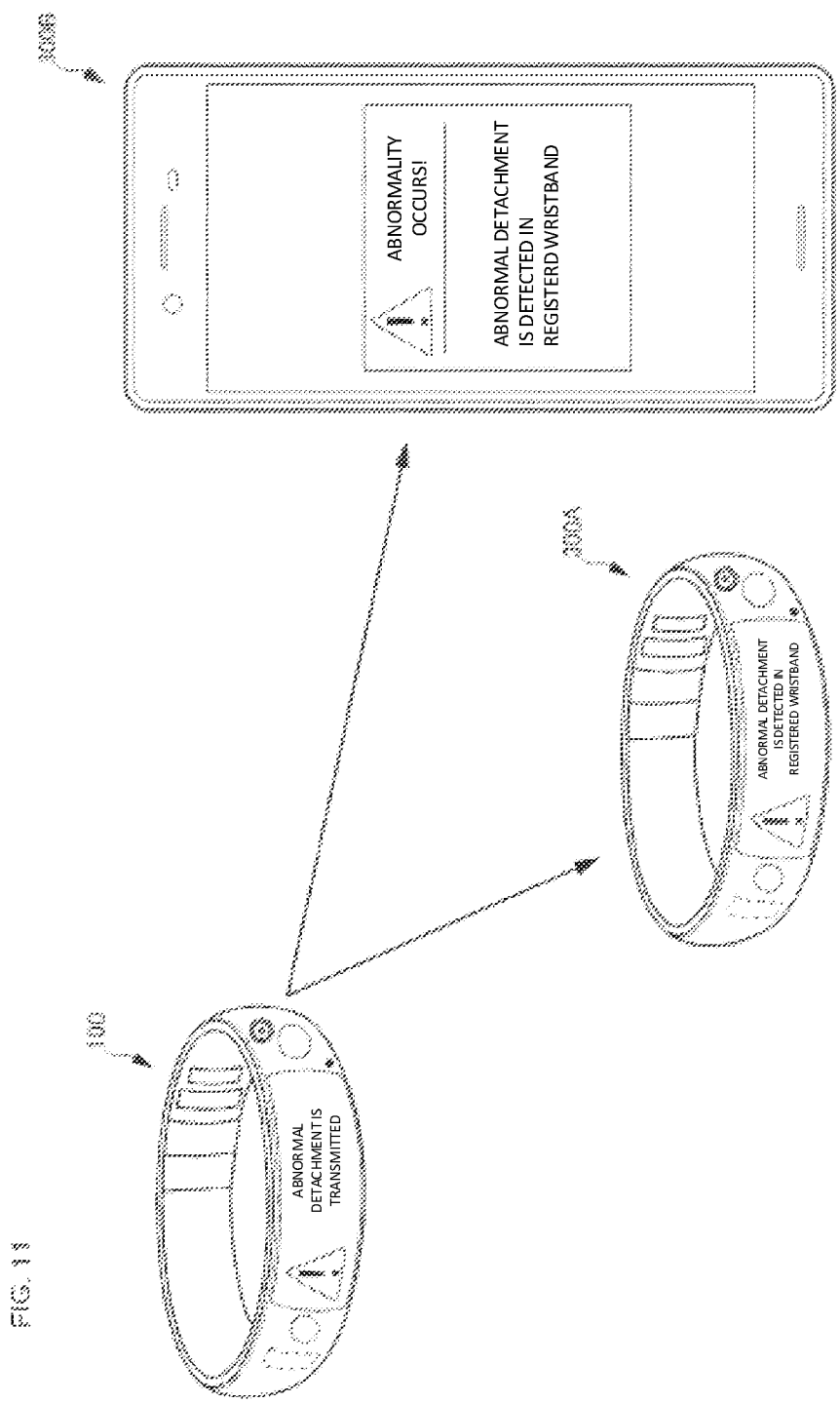
FIG. 11 is a diagram illustrating a second example of processing when abnormal detachment of a wearing device is detected.

In the second method, the terminal device 300 registered in association with the wristband 100 of the user in advance is notified of a detection result indicating that abnormal detachment has been performed, as illustrated in FIG. 11. In FIG. 11, a wristband 300A and a smartphone 300B are shown as the terminal device 300. The wristband 300A and the smartphone 300B are, for example, terminal devices owned by the family member of the user.

Figure 12:
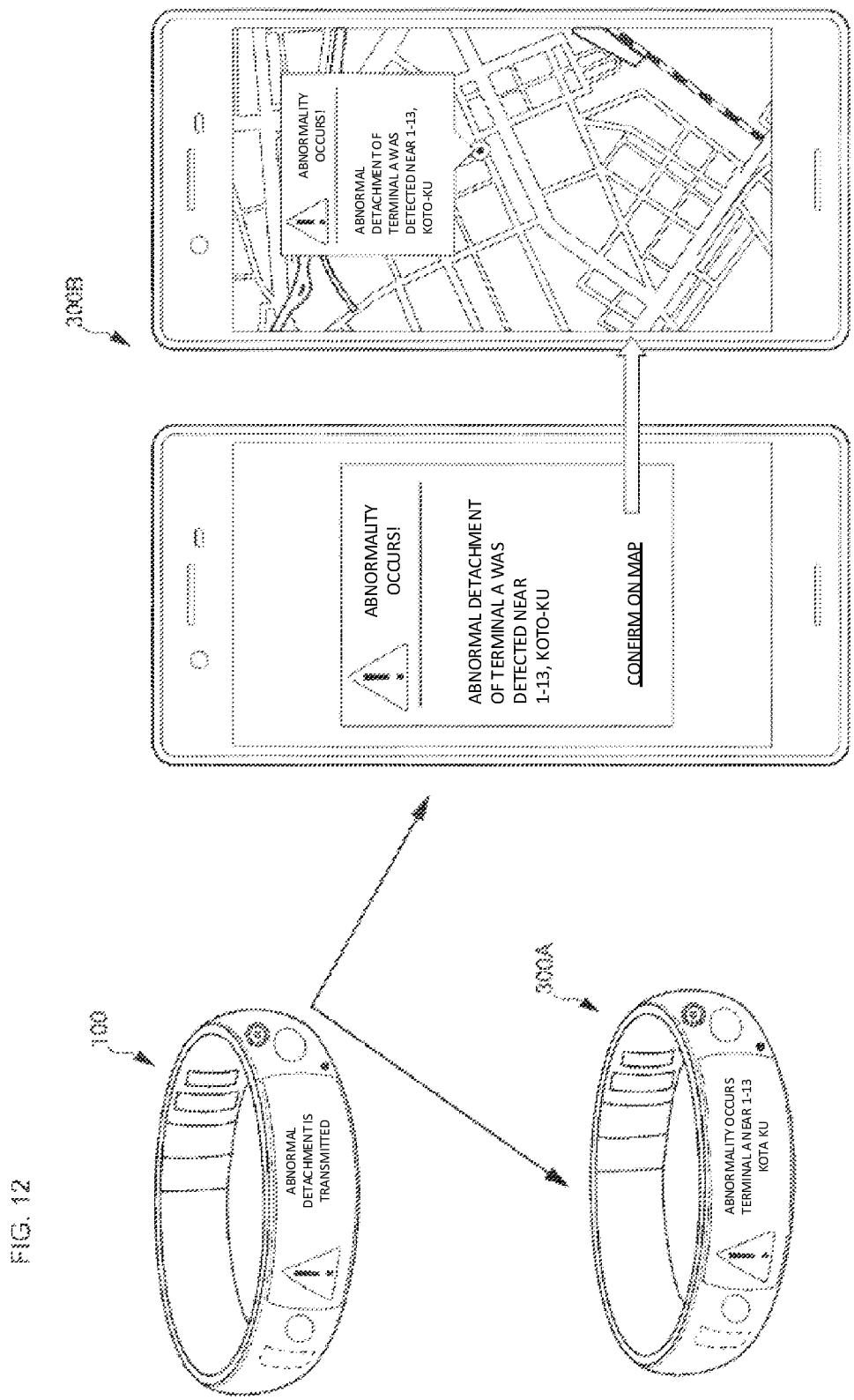
FIG. 12 is a diagram illustrating the second example of processing when abnormal detachment of a wearing device is detected.

A notification method may be any method such as an e-mail, a message in various SNSs, or a notification on a dedicated application. Further, position information of the wristband 100 may be transmitted at the same time when this notification is performed, as illustrated in FIG. 12. In the wristband 300A that has received the position information, the position information is displayed as a character string indicating an address, and in the smartphone 300B, the position information can also be displayed as a map, in addition to the character string indicating the address. This allows a position of the wristband 100 that has been abnormally detached to be accurately informed of.

Figure 13:
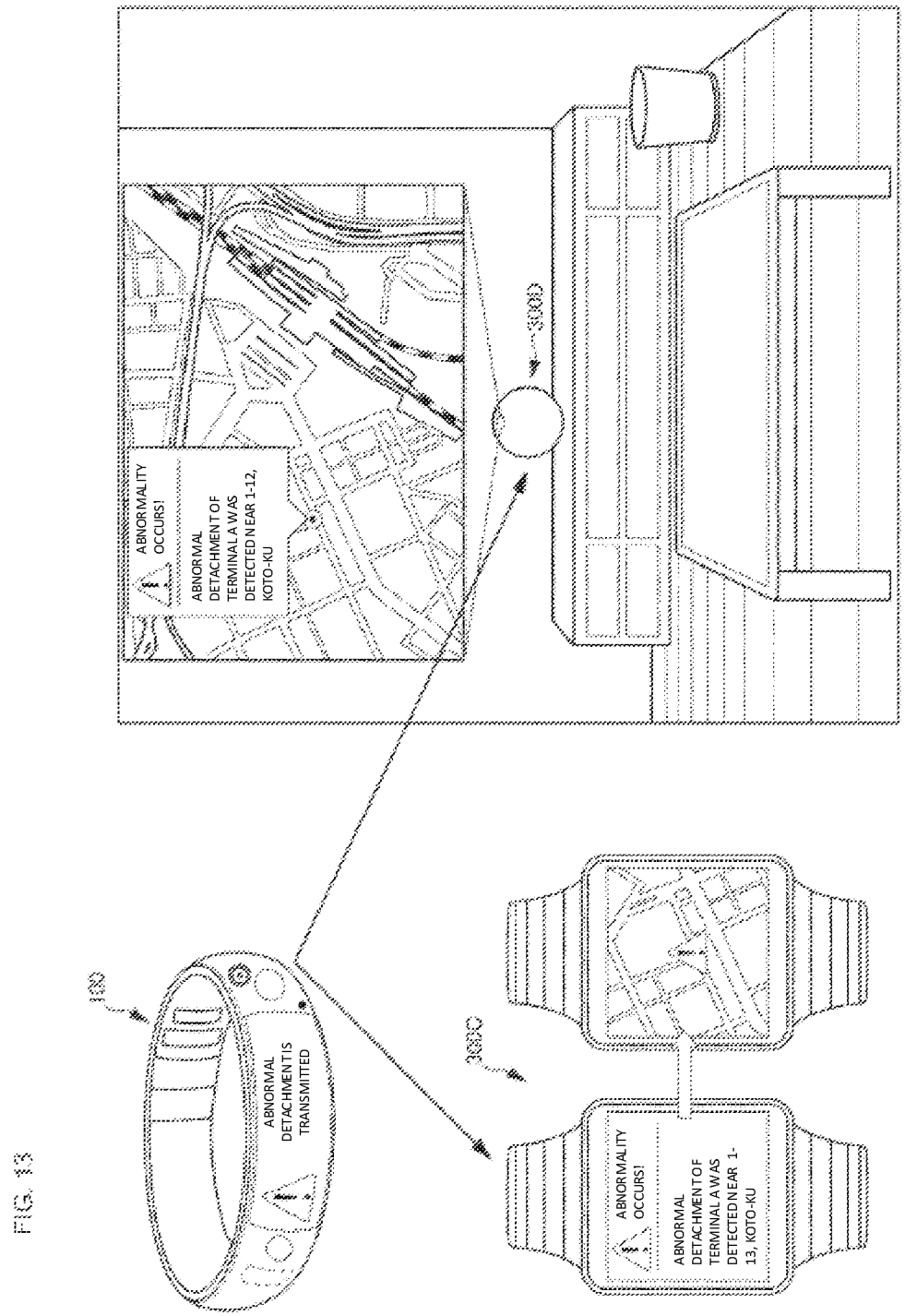
FIG. 13 is a diagram illustrating the second example of processing when abnormal detachment of a wearing device is detected.

Further, when the terminal device 300 registered in association with the wristband 100 of the user in advance is a wristwatch type device 300C including a large display, the wristwatch type device 300C may perform both of a message display and a position information display in a map format, as illustrated in FIG. 13. Further, when the terminal device 300 registered in association with the wristband 100 of the user in advance is a smart speaker 300D with a projector function, a message may be output by voice and a position information display in a map format may be performed as a projector display.

Figure 14:
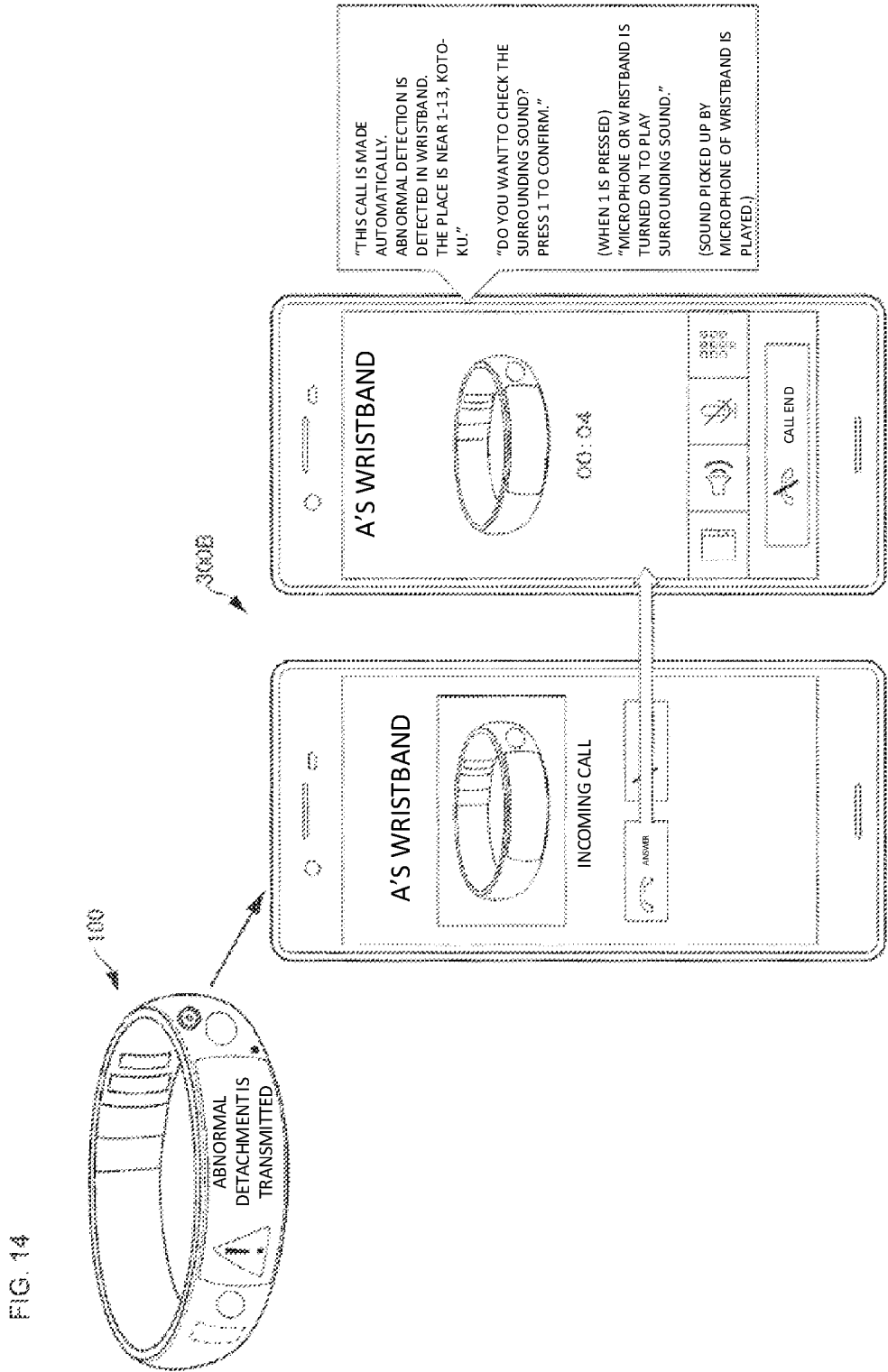
FIG. 14 is a diagram illustrating a third example of processing when abnormal detachment of a wearing device is detected.

The third method is to make a call to a telephone number registered in advance, as illustrated in FIG. 14. This allows a voice message to be output from the smartphone 300B corresponding to the registered telephone number, and a situation of surroundings of the user to be informed of by voice even when the user cannot speak. The telephone number needs to be stored and registered in the storage unit 104 in advance.

The position information of the wristband 100 may be automatically transmitted by voice when a call is made. This allows the position of the user to be transmitted to the other party of the telephone even when the user cannot speak.

This call may be made directly from the wristband 100, or an external device such as a server may be notified of the abnormal detachment and make a call to a telephone number registered in advance. According to a method using the external device such as the server as described above, it is possible to continue to make a call, for example, even when the wristband 100 is broken after the wristband 100 is abnormally detached.

In the fourth method, an image and/or video of the vicinity of the wristband 100 captured by the camera 116 is transmitted in units of files to the smartphone 300B registered in association with the wristband 100 of the user in advance, as illustrated in FIG. 15. Thereby, a situation of the vicinity of the wristband 100 can be transmitted.

In the case of images, it is preferable for a plurality of images taken at predetermined time intervals for a predetermined time after detection of the abnormal detachment to be transmitted. Further, in the case of videos, it is preferable for a video taken for a predetermined time after the detection of the abnormal detachment to be transmitted. A sound acquired by the microphone 117 may be transmitted according to the transmission of the image and the video. The image and/or the video may be once stored in the storage unit 104 of the wristband 100 and then transmitted, may be transmitted (streamed) in real time as illustrated in FIG. 16, or may be transmitted to an external server and transmitted from the server to registered equipment.

In a fifth method, the position information is periodically acquired by the positioning sensor 111 of the wristband 100 and transmitted to the smartphone 300B serving as the terminal device 300 registered in advance, as illustrated in FIG. 17. The smartphone 300B displays the periodically received position information on a map display together with a reception time. This allows a current position and a movement route to be confirmed even when the user wearing the wristband 100 is taken away.

In a sixth method, when abnormal detachment of the wristband 100 is detected at a predetermined place such as a home of the user, a state of the predetermined place is photographed by a first terminal device (for example, a home camera 300E) having a camera function registered in association with the wristband 100 in advance, as illustrated in FIG. 18. The home camera 300E transmits a captured image and/or video to a second terminal device (for example, the smartphone 300B) registered in association with the wristband 100 in advance. Accordingly, it is possible to confirm a situation of the user even when the wristband 100 does not have a camera function.

The methods described above may be executed not only independently but also in combination. Further, when the terminal device 300 receives a notification indicating that the abnormal detachment of the wristband 100 has been detected from the information processing device 200, the terminal device 300 may request the information processing device 200 to transmit information on the wristband 100. The information processing device 200 receives the request from the terminal device 300 and then transmits the information on the wristband 100 to the terminal device 300. However, the information processing device 200 may automatically transmit the information on the wristband 100 to the terminal device 300 regardless of whether or not there is the request from the terminal device 300 when the abnormal detachment is detected. The information on the wristband 100 is the position information of the wristband 100, and the captured image and the video of the periphery of the wristband 100, and the like described in the first to sixth methods described above.

The present technology is configured as described above. According to the present technology, it is possible for a specific person such as a family member to ascertain a situation of the user who wears the wristband 100 serving as the wearing device and confirm the safety of the user. For example, it is possible for the family member to confirm the safety of a child when the child goes to school or returns to home from school and prevent the child from getting lost by causing the child to wear the wristband 100.

Further, it is possible to prevent a malicious person from damaging the user wearing the wristband 100, which is a wearing device, or detaching and misusing the wristband 100. Further, when the user is in a dangerous state or is about to be in a dangerous state, it is possible to inform a specific person such as a family member of the user of the fact.

2. MODIFICATION EXAMPLE

The embodiments of the present technology have been specifically described above, but the present technology is not limited to the above-described embodiment, and various modifications based on the technical spirit of the present technology are possible.

Figure 19A:
FIGS. 19A and 19B are diagrams illustrating a modification example of the wearing device.
Figure 19B:
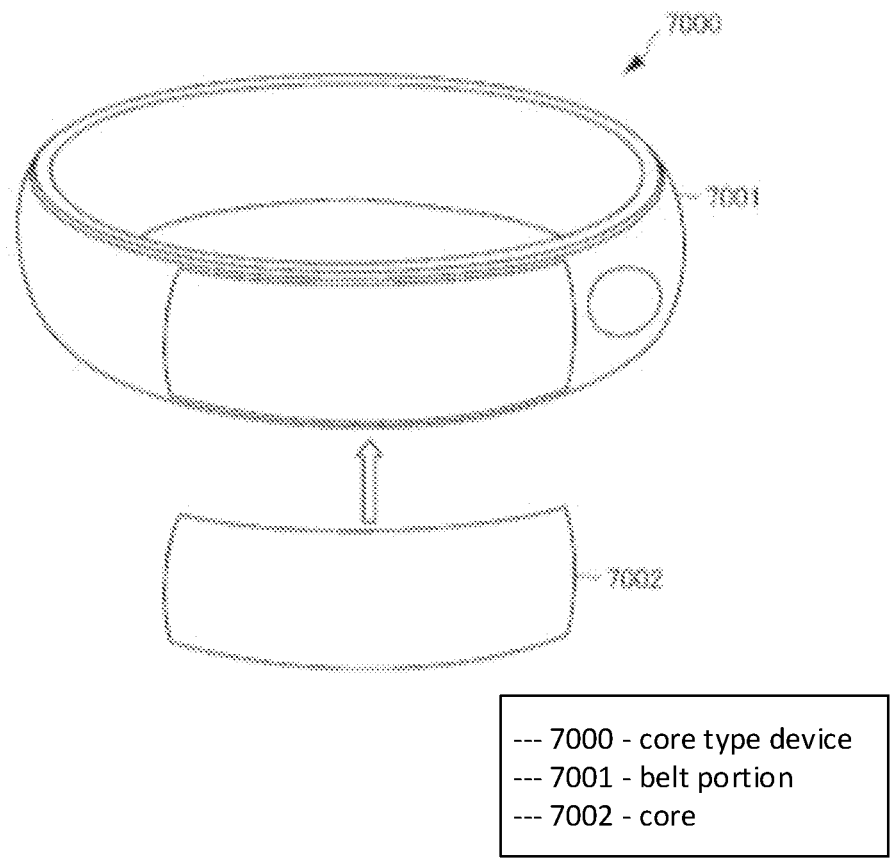

The wearing device is not limited to a bangle-like appearance shape such as the wristband 100 illustrated in FIG. 2, and may be a watch-type wearable device 6000 as illustrated in FIG. 19A. Further, the wearable device may be a so-called core type device 7000 in which a core 7002 that performs processing is fitted to a belt portion 7001 as illustrated in FIG. 19B.

The wearing device is not limited to a ring-shaped device fitted to an arm, and may have any shape or configuration as long as the wearing device is worn on a body of the user, like a wearing device attached to the body or wearing device worn on a head of the user.

Further, in the user authentication at the time of detachment of the wristband 100, the detachment may be allowed with biometric authentication of a person other than the user, which is a specific person (a family member or the like) registered in advance.

Further, in the abnormal detachment detection described above, the abnormal detachment detection may be performed even when the detachment is about to be performed through biometric authentication of a person other than the user himself or herself or the specific person (a family member or the like) registered in advance.

Further, once the abnormal detachment is detected, a user authentication function may be locked so that the user himself or herself cannot detach the wristband 100 unless a predetermined person such as the family member of the user is near the user. This can prevent a malicious person from forcing a finger of the user into contact with the authentication sensor 114 to make the user authentication successful, for example, when the user authentication is fingerprint authentication.

Further, the present technology can be used for animals such as pets other than a person. For example, when the information processing device 200 of the present technology is applied to a collar for a pet such as a dog or a cat serving as a wearing device, it is possible to secure the safety of the pet, like the user in the embodiment. In the collar serving as the wearing device for a pet to which the information processing device 200 of the present technology has been applied, because the pet itself does not perform the user authentication on his/her own will, authentication processing may be performed using biometric information of an owner.

Although a case in which the wristband 100, for example, notifies the terminal device 300 directly has been described in the embodiment, the wristband 100 may notify the terminal device 300 using a server.

Figure 20:
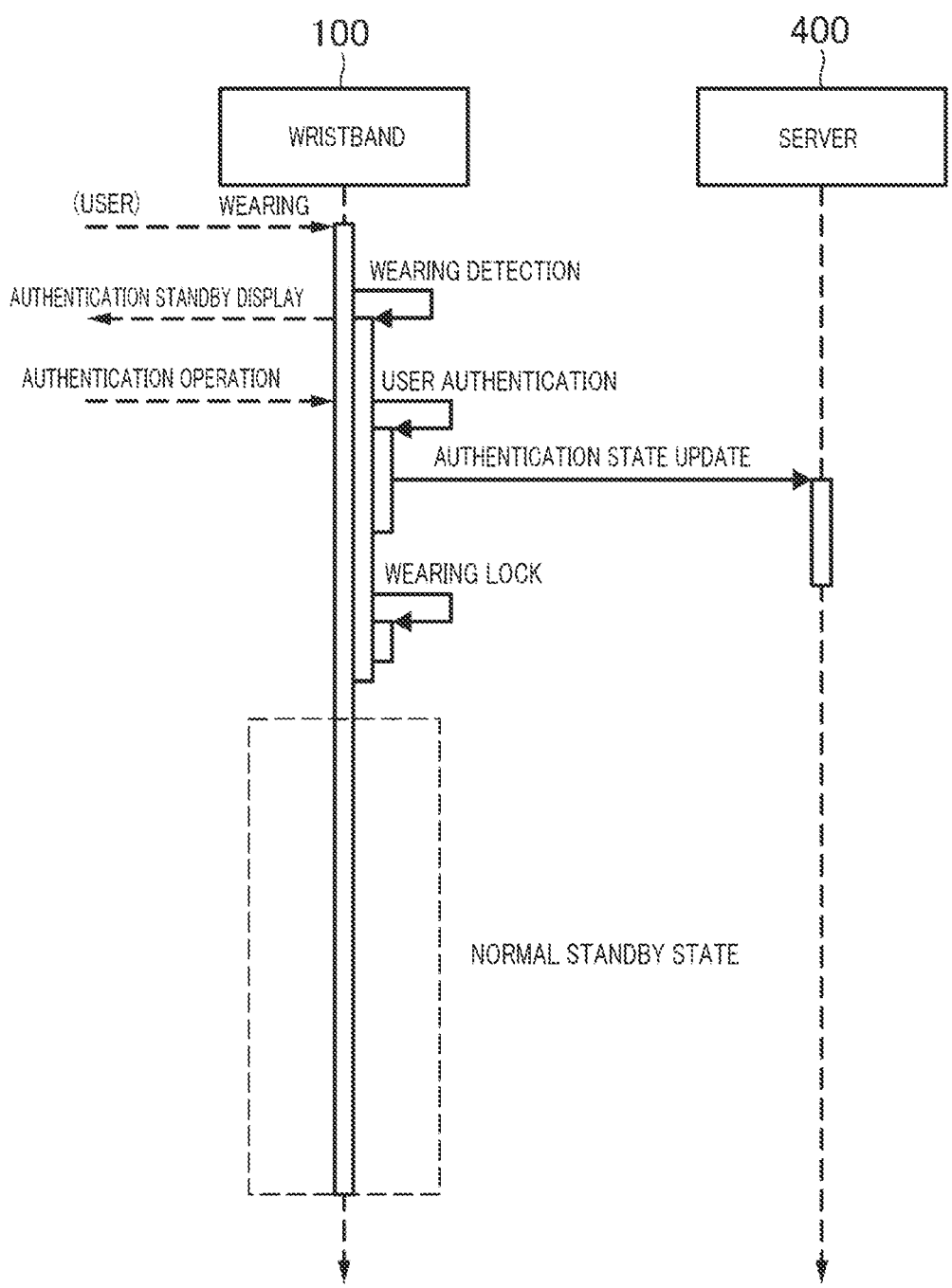
FIG. 20 is a sequence diagram illustrating processing when a server is used.

A flow of processing when the server 400 is used for use of the wristband 100 will be described. FIG. 20 is a sequence diagram of processing in a normal standby state (a usage state) after the wristband 100 is worn. First, when the user wears the wristband 100, wearing detection is performed in the wristband 100. When the wearing detection is performed, a display indicating authentication standby is performed on the display unit 108 of the wristband 100.

When the user performs an authentication operation (for example, a finger is brought into contact with the sensor when the authentication sensor 114 is a fingerprint sensor), the user authentication processing is performed, and when the user authentication is successful, authentication state update information is transmitted from the wristband 100 to the server 400. The worn state is locked in the wristband 100 and the wristband 100 enters a usage state.

Figure 21:
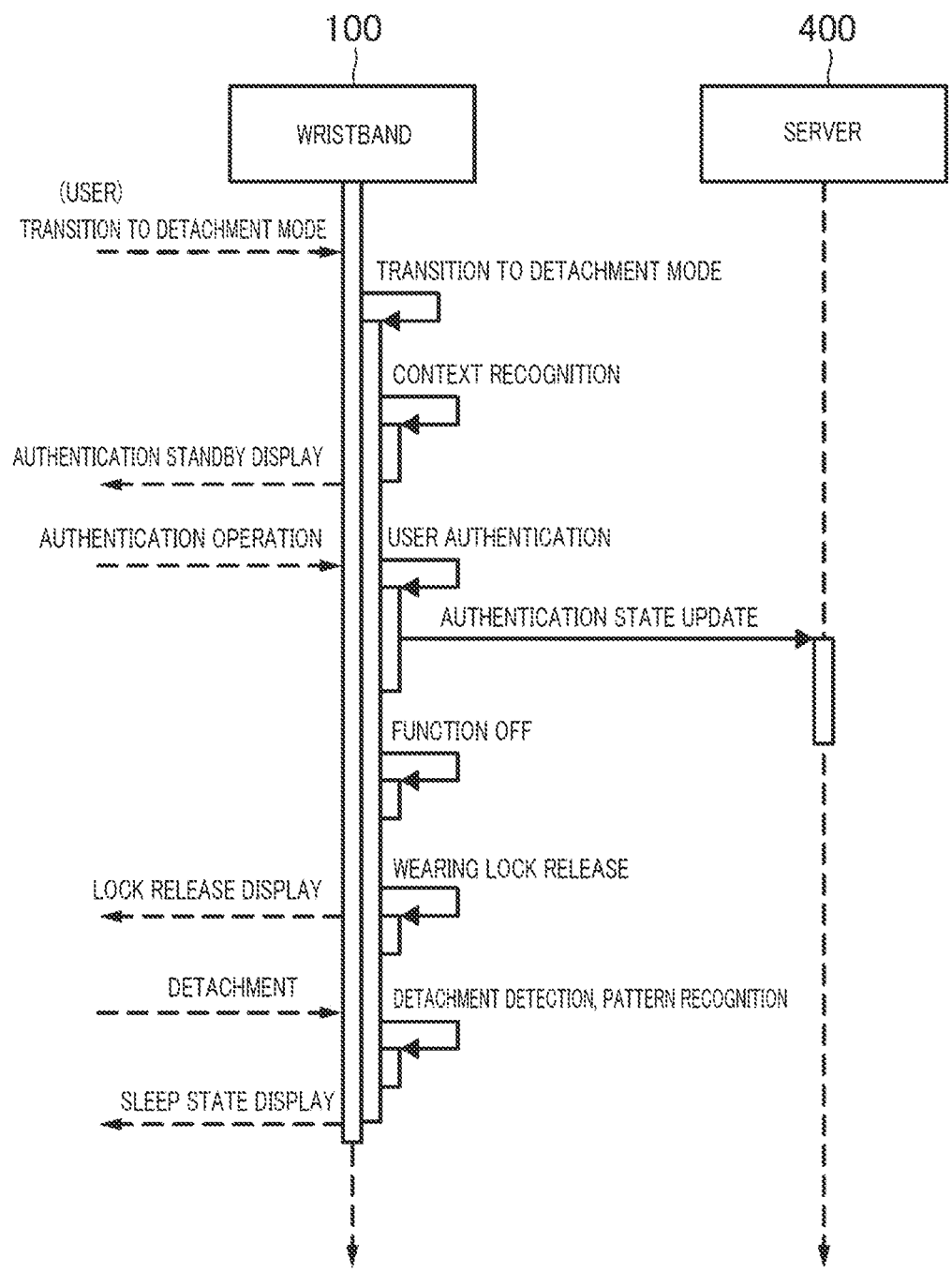
FIG. 21 is a sequence diagram illustrating processing when a server is used.

FIG. 21 is a sequence diagram of processing from a normal standby state (a usage state) of the wristband 100 to normal detachment. First, when the user inputs to the wristband 100 an instruction to transition to the detachment mode, the wristband 100 transitions to the detachment mode. Next, a display indicating authentication standby is performed on the display unit 108 of the wristband 100.

When the user performs the authentication operation, the user authentication processing is performed, and when the user authentication is successful, authentication state update information is transmitted from the wristband 100 to the server 400. The wearing lock state is released in the wristband 100, and a display indicating the wearing lock release is displayed on the display unit 108. The wristband function is then turned off.

When the user detaches the wristband 100, detachment detection and recognition of a detachment pattern are performed in the wristband 100, and a display indicating that the wearing lock is released is performed on the display unit 108. The function of the wristband 100 is turned off to enter the sleep state, and an indication that the wristband 100 is in the sleep state is displayed on the display unit 108.

Figure 22:
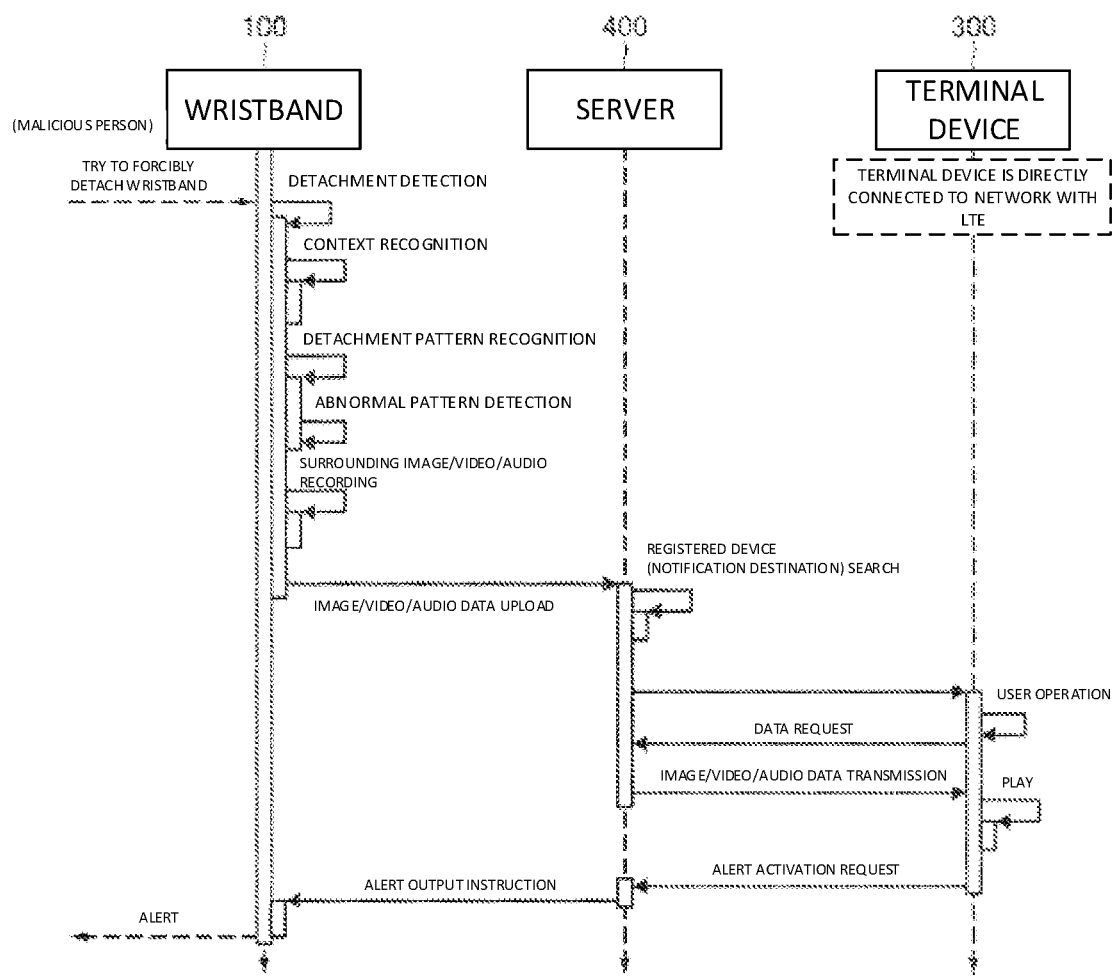
FIG. 22 is a sequence diagram illustrating processing when a server is used.

FIG. 22 is a sequence diagram of processing in which abnormal detachment of the wristband 100 is performed and a terminal device 300 of a family member of the user is notified of the abnormal detachment via the server 400. The terminal device 300 is connected to a network by, for example, long term evolution (LTE).

When a malicious person tries to forcibly detach the wristband 100 from the user and abnormal detachment is detected in the wristband 100, context detection, detachment pattern recognition, abnormal pattern detection, and acquisition of images or videos and voices of the vicinity are performed in the wristband 100. Image or video data and audio data are uploaded from the wristband 100 to the server 400.

The server 400 searches for the terminal device 300 corresponding to the wristband 100 registered in advance. When the server 400 notifies the terminal device 300 of the abnormal detachment and the terminal device 300 sends a data request to the server 400, the server 400 transmits image or video data and audio data to the terminal device 300. When the position information is also transmitted from the wristband 100 to the server 400, the position information may also be transmitted from the server 400 to the terminal device 300.

When the terminal device 300 sends an alert activation request to the server 400, the server 400 sends an alert output instruction to the wristband 100 and the wristband 100 outputs an alert.

FIG. 23 is a sequence diagram of processing of notifying a plurality of terminal devices 310, 320, 330, 340 of family members of the user of abnormal detachment of the wristband 100 via the server 400.

Processes up to processing of uploading the image or video data and the audio data from the wristband 100 to the server 400 is the same as those in FIG. 22. The server 400 searches for a terminal device corresponding to the wristband 100 registered in advance, and notifies all the registered terminal devices of the abnormal detachment.

When a data request is sent from any one (the terminal device 300 in FIG. 23) of the plurality of registered terminal devices to the server 400, the server 400 transmits the image or video data and the audio data to the terminal device 300.

As described above, the processing between the wristband 100, the server 400, and the terminal device 300 is performed. The processes of the sequence diagrams of FIGS. 20 to 23 are merely examples and the present technology is not limited to a range thereof.

The present technology can also be configured as follows.

(1)

An information processing device that transmits a detection result to another device when an abnormal detachment of a wearing device worn by a user is detected.

(2)

The information processing device according to (1), wherein first authentication processing is performed when the user wears the wearing device.

(3)

The information processing device according to (1) or (2), wherein second authentication processing is performed when the user detaches the wearing device.

(4)

The information processing device according to any one of (1) to (3), wherein the abnormal detachment is detected on the basis of sensor information acquired by a sensor included in the wearing device.

(5)

The information processing device according to (3), wherein, when the wearing device is detached without the second authentication processing being performed successfully, the detachment is detected as the abnormal detachment.

(6)

The information processing device according to (3), wherein the second authentication processing is performed using biometric authentication.

(7)

The information processing device according to (3), wherein the second authentication processing is performed using authentication of a motion of the user.

(8)

The information processing device according to any one of (1) to (7), wherein, when the abnormal detachment is detected, alert execution processing is performed in the wearing device.

(9)

The information processing device according to (3), wherein, when the user wearing the wearing device is in a predetermined state, the second authentication processing is skipped.

(10)

The information processing device according to (9), wherein a determination whether the user is in the predetermined state on the basis of position information of the wearing device is performed.

(11)

The information processing device according to (9), wherein a determination whether the user is in the predetermined state on the basis of habitualness of a state of the user is performed.

(12)

An information processing method including transmitting a detection result to another device when an abnormal detachment of a wearing device worn by a user is detected.

(13)

An information processing program for causing a computer to execute an information processing method including transmitting a detection result to another device when an abnormal detachment of a wearing device worn by a user is detected.

(14)

A terminal device that receives information on a wearing device worn by a user from an information processing device that detects abnormal detachment of the wearing device.

(15)

The terminal device according to (14), wherein the information on the wearing device is position information of the wearing device.

(16)

The terminal device according to (14) or (15), wherein the information on the wearing device is a voice around the wearing device.

(17)

The terminal device according to any one of (14) to (16), wherein the information on the wearing device is a video and/or image around the wearing device.

(18)

The terminal device according to any one of (14) to (17), wherein, when a detection result indicating the abnormal detachment of the wearing device worn by the user is received from the information processing device, the information processing device is requested to transmit information on the wearing device.

(19)

A method for controlling a terminal device, including receiving information on a wearing device worn by a user from an information processing device that detects abnormal detachment of the wearing device.

(20)

A control program for causing a computer to execute a control method including receiving information on a wearing device worn by a user from an information processing device that detects abnormal detachment of the wearing device.

REFERENCE SIGNS LIST

100 Wristband
109 Motion and attitude sensor
110 Geomagnetic sensor
111 Positioning sensor
113 Biometric sensor
114 Authentication sensor
200 Information processing device
300 Terminal device
300A Wristband
300B Smartphone
300C Wristwatch type device
300D Smart speaker
300E Home camera

The invention claimed is:

1. An information processing device, comprising:
circuitry configured to:
  detect abnormal detachment of a wearing device when the wearing device is worn by a user;
  transmit a detection result to an external device based on the detection of the abnormal detachment of the wearing device;
  receive, based on the transmitted detection result, a request from the external device to transmit information associated with the wearing device; and
  transmit, based on the received request, the information associated with the wearing device to the external device, wherein the information associated with the wearing device includes at least one of a video or an image around the wearing device.

2. The information processing device according to claim 1, wherein the circuitry is further configured to execute a first authentication processing operation of authentication of the user when the user wears the wearing device.

3. The information processing device according to claim 1, wherein the circuitry is further configured to execute a second authentication processing operation of authentication of the user when the user detaches the wearing device.

4. The information processing device according to claim 1, wherein the abnormal detachment is detected based on sensor information acquired by a sensor in the wearing device.

5. The information processing device according to claim 3, wherein detachment of the wearing device is detected as the abnormal detachment based on unsuccessful execution of the second authentication processing operation of authentication of the user.

6. The information processing device according to claim 3, wherein the circuitry is further configured to execute the second authentication processing operation based on biometric authentication.

7. The information processing device according to claim 3, wherein the circuitry is further configured to execute the second authentication processing operation based on authentication of a motion of the user.

8. The information processing device according to claim 1, wherein the circuitry is further configured to control execution of an alert execution processing operation in the wearing device based on the detection of the abnormal detachment.

9. The information processing device according to claim 3, wherein the circuitry is further configured to skip the second authentication processing operation based on the user wearing the wearing device in a specific.

10. The information processing device according to claim 9, wherein the circuitry is further configured to determine, based on position information of the wearing device whether the user is in the specific.

11. The information processing device according to claim 9, wherein the circuitry is further configured to determine, based on habitualness of a state of the user whether the user is in the specific state.

12. An information processing method, comprising:
    detecting abnormal detachment of a wearing device when the wearing device is worn by a user;
    transmitting a detection result to an external device based on the detection of the abnormal detachment of the wearing device;
    receiving, based on the transmitted detection result, a request from the external device to transmit information associated with the wearing device; and
    transmitting, based on the received request, the information associated with the wearing device to the external device, wherein the information associated with the wearing device includes at least one of a video or an image around the wearing device.

13. A non-transitory computer-readable medium having stored thereon, computer-executable instructions which, when executed by a processor, cause the processor to execute operations, the operations, comprising:
    detecting abnormal detachment of a wearing device when the wearing device is worn by a user;
    transmitting a detection result to an external device based on the detection of the abnormal detachment of the wearing device;
    receiving, based on the transmitted detection result, a request from the external device to transmit information associated with the wearing device; and
    transmitting, based on the received request, the information associated with the wearing device to the external device, wherein the information associated with the wearing device includes at least one of a video or an image around the wearing device.

14. A terminal device, comprising:
    circuitry configured to:
    receive, from an external device that detects abnormal detachment of a wearing device when the wearing device is worn by a user, a detection result indicating the abnormal detachment of the wearing device;
    transmit, based on the received detection result, a request to the external device to transmit information associated with the wearing device; and
    receive, based on the transmitted request, the information associated with the wearing device from the external device, wherein the information associated with the wearing device includes at least one of a video or an image around the wearing device.

15. The terminal device according to claim 14, wherein the information associated with the wearing device further includes position information of the wearing device.

16. The terminal device according to claim 14, wherein the information associated with the wearing device further includes a voice around the wearing device.

17. An information processing method, comprising:
    receiving, from an external device that detects abnormal detachment of a wearing device when the wearing device is worn by a user, a detection result indicating the abnormal detachment of the wearing device;
    transmitting, based on the received detection result, a request to the external device to transmit information associated with the wearing device; and
    receiving, based on the transmitted request, the information associated with the wearing device from the external device, wherein the information associated with the wearing device includes at least one of a video or an image around the wearing device.

18. A non-transitory computer-readable medium having stored thereon, computer-executable instructions which, when executed by a processor, cause the processor to execute operations, the operations, comprising:
    receiving, from an external device that detects abnormal detachment of a wearing device when the wearing device is worn by a user, a detection result indicating the abnormal detachment of the wearing device;
    transmitting, based on the received detection result, a request to the external device to transmit information associated with the wearing device; and
    receiving, based on the transmitted request, the information associated with the wearing device from the external device, wherein the information associated with the wearing device includes at least one of a video or an image around the wearing device.

* * * * *